US012777509B2

(12) United States Patent
Brillant et al.

(10) Patent No.: US 12,777,509 B2
(45) Date of Patent: Oct. 27, 2026

(54) METHOD AND SYSTEM FOR COEXISTENCE AND SPURIOUS MITIGATION IN MULTICOM PLATFORMS

(71) Applicant: RAFAEL ADVANCED DEFENSE SYSTEMS LTD., Haifa (IL)

(72) Inventors: Avigdor Brillant, Zichron Yaakov (IL); David Pezo, Netanya (IL); Rafael Azoulay, Shimshit (IL); David Cahana, Haifa (IL)

(73) Assignee: RAFAEL ADVANCED DEFENSE SYSTEMS LTD., Haifa (IL)

( * ) Notice: Subject to any disclaimer, the term of this patent is extended or adjusted under 35 U.S.C. 154(b) by 541 days.

(21) Appl. No.: 18/273,434

(22) PCT Filed: Jan. 25, 2022

(86) PCT No.: PCT/IL2022/050101
§ 371 (c)(1),
(2) Date: Jul. 20, 2023

(87) PCT Pub. No.: WO2022/162658
PCT Pub. Date: Aug. 4, 2022

(65) Prior Publication Data

US 2025/0344235 A1 Nov. 6, 2025

(30) Foreign Application Priority Data

Jan. 26, 2021 (IL) .......................................... 280438

(51) Int. Cl.
*H04W 72/541* (2023.01)
*H04W 72/0453* (2023.01)

(52) U.S. Cl.
CPC ..... *H04W 72/541* (2023.01); *H04W 72/0453* (2013.01)

(58) Field of Classification Search
CPC ............. H04W 72/541; H04W 72/045; H04W 72/044; H04W 72/232; H04L 5/0012
See application file for complete search history.

(56) References Cited

U.S. PATENT DOCUMENTS 7,155,218 B1 * 12/2006 Fessler .................. H04W 24/00 455/425
10,720,947 B1 * 7/2020 Regadamilli ........ H04B 1/1027
2005/0265288 A1 * 12/2005 Liu ..................... H04W 72/541 370/332

(Continued)

FOREIGN PATENT DOCUMENTS

WO 2019190554 A1 10/2019

*Primary Examiner* — Christine Ng
(74) *Attorney, Agent, or Firm* — The Roy Gross Law Firm, LLC; Roy D. Gross

(57) ABSTRACT

A multi-communication (MC) system supporting mitigation plan for interfering spurious products, comprising: a) at last one first client that is configured to perform wireless communication; b) at least one second client that is capable of generating spurious product that potentially interferes with said first client communication; c) a Clock-Frequency-Base Band Management Unit (CFBBMU) module configured to repeatedly: i. generates a spurious map based on data collected from one or more of said clients; and ii. utilizes said generated spurious map to mitigate clients' interference.

14 Claims, 9 Drawing Sheets

Initialization

(56) References Cited

U.S. PATENT DOCUMENTS

| | | | | |
|---|---|---|---|---|
| 2009/0191910 | A1* | 7/2009 | Athalye | H04W 52/243 455/522 |
| 2010/0273426 | A1 | 10/2010 | Walley et al. | |
| 2011/0085795 | A1* | 4/2011 | Ozaki | H04Q 11/0067 398/25 |
| 2011/0149764 | A1 | 6/2011 | Wietfeldt et al. | |
| 2012/0082077 | A1* | 4/2012 | Zhang | H04L 5/14 370/328 |
| 2013/0065533 | A1 | 3/2013 | Cai et al. | |
| 2013/0083767 | A1* | 4/2013 | Goto | H04W 52/346 370/329 |
| 2013/0273929 | A1 | 10/2013 | Gupta et al. | |
| 2017/0295581 | A1* | 10/2017 | Takagi | H04B 17/26 |
| 2018/0027506 | A1* | 1/2018 | Pasulka | H04W 72/541 370/338 |
| 2018/0262995 | A1* | 9/2018 | Akkarakaran | H04L 5/0094 |
| 2019/0335346 | A1* | 10/2019 | Abadie | G01R 31/002 |
| 2020/0195356 | A1 | 6/2020 | Peitzer et al. | |
| 2020/0260458 | A1* | 8/2020 | Noble | H04L 5/0094 |
| 2020/0396695 | A1* | 12/2020 | Bhushan | H04B 17/336 |

* cited by examiner

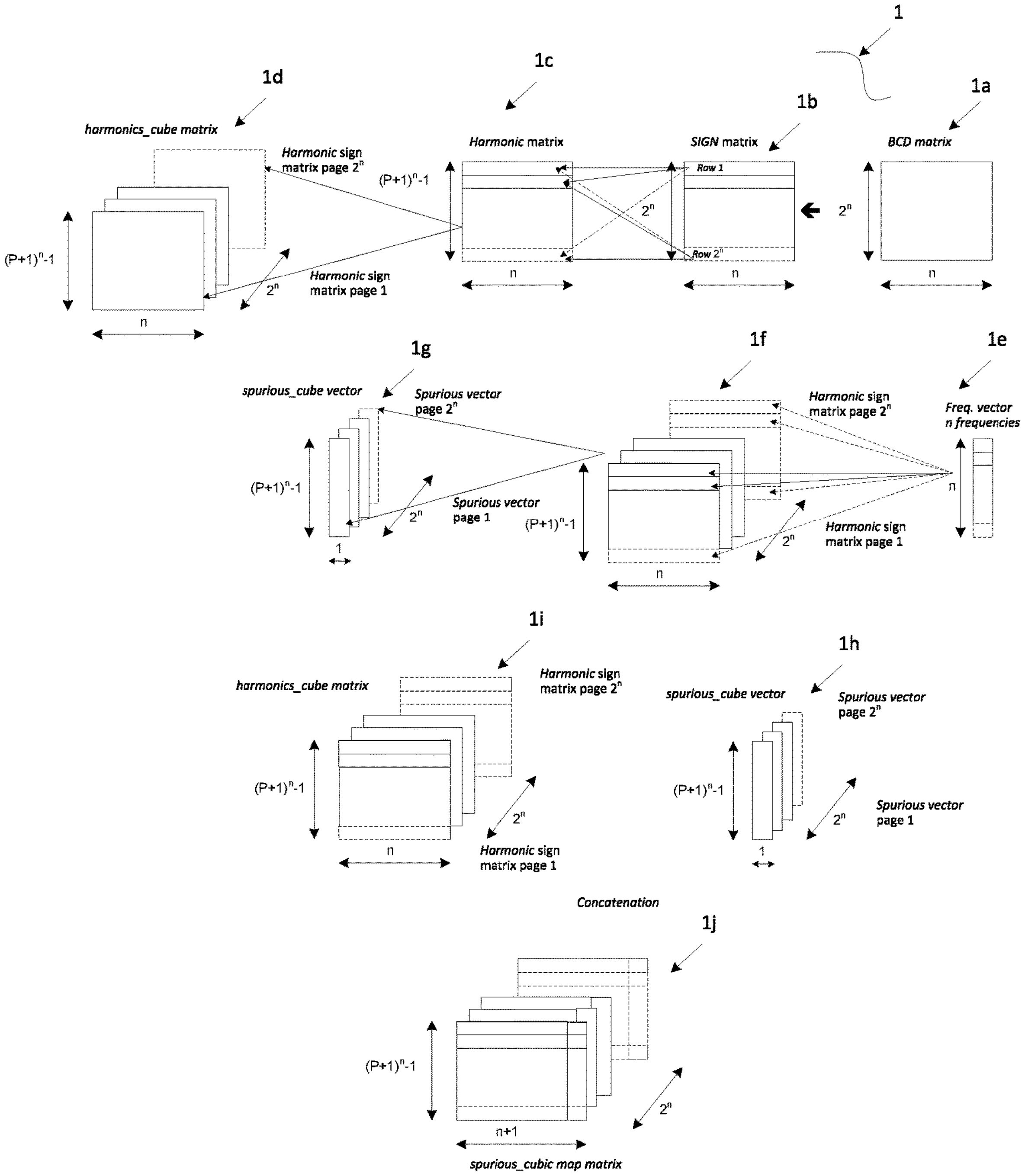
Figure 1: Matricial structures for spurious analysis

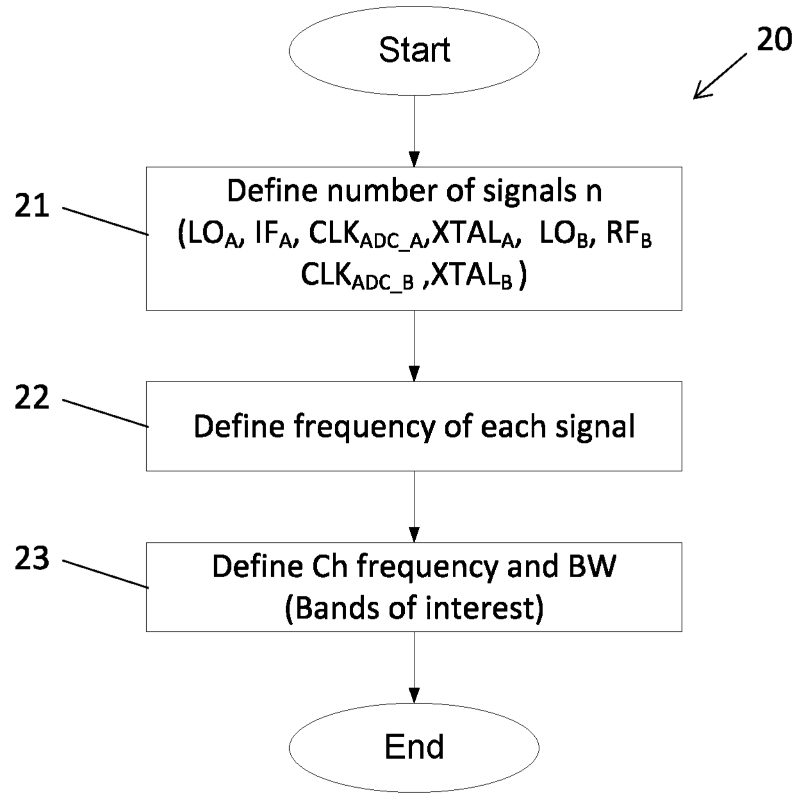
Figure 2: Initialization
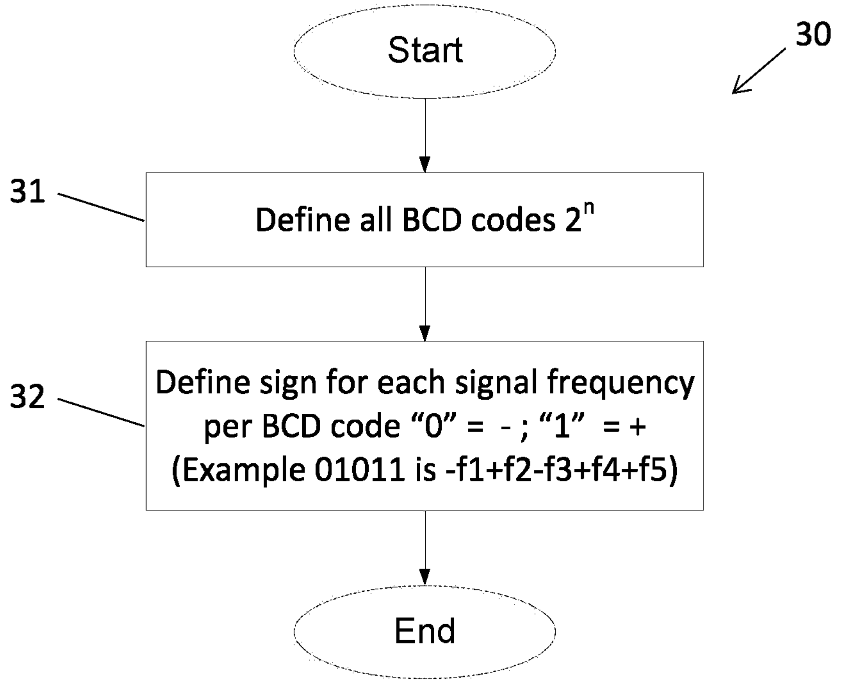
Figure 3: Sign per BCD code

Start
41
Load Channels and BW
(Number of band of interest)
42
ChINDEX = 1
43
BW_INDEX = 1
44
BW_of_Interest_ Start_ freq=ChCenterFreqChINDEX - (BWBWINDEX/2)
45
BW_of_Interest_ Stop_ freq=ChCenterFreqChINDEX + (BWBWINDEX/2)
46
Run spurious mapping sweep and
record results
47
BW_INDEX = End
49
BW_INDEX = BW_INDEX + 1
48
BW_INDEX = End
50
ChINDEX = ChINDEX + 1
END

Figure 4: Scanning spurious per band of interest

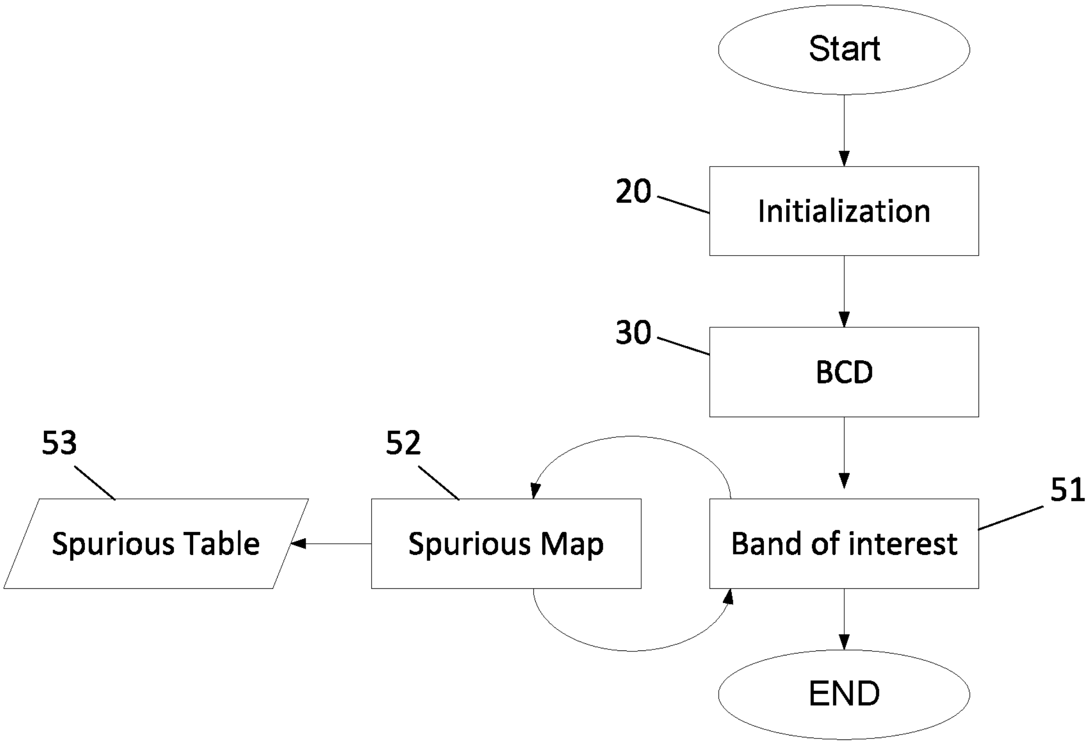
Figure 5: Main program call to routines
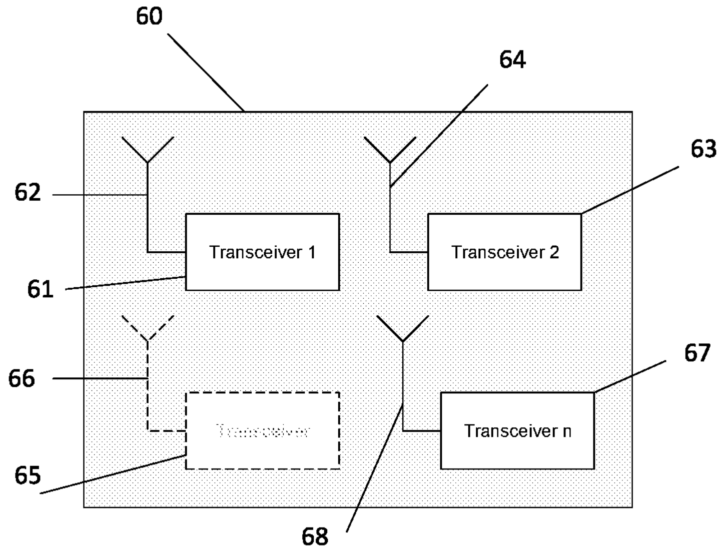
Figure 6: MultiCom system in one single platform

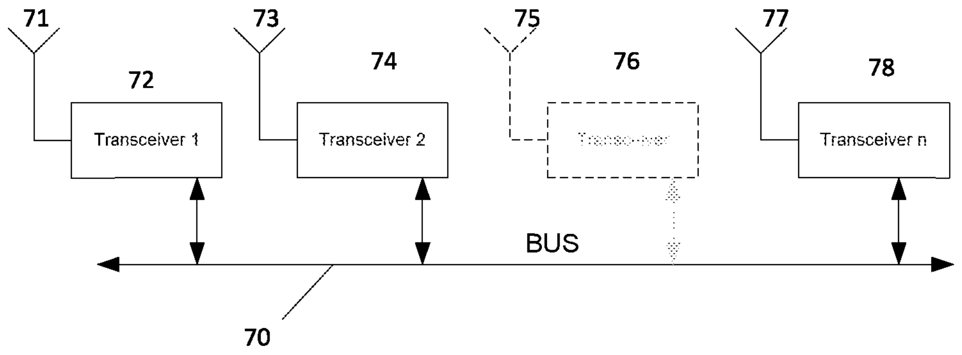
Figure 7: MultiCom system in different platforms
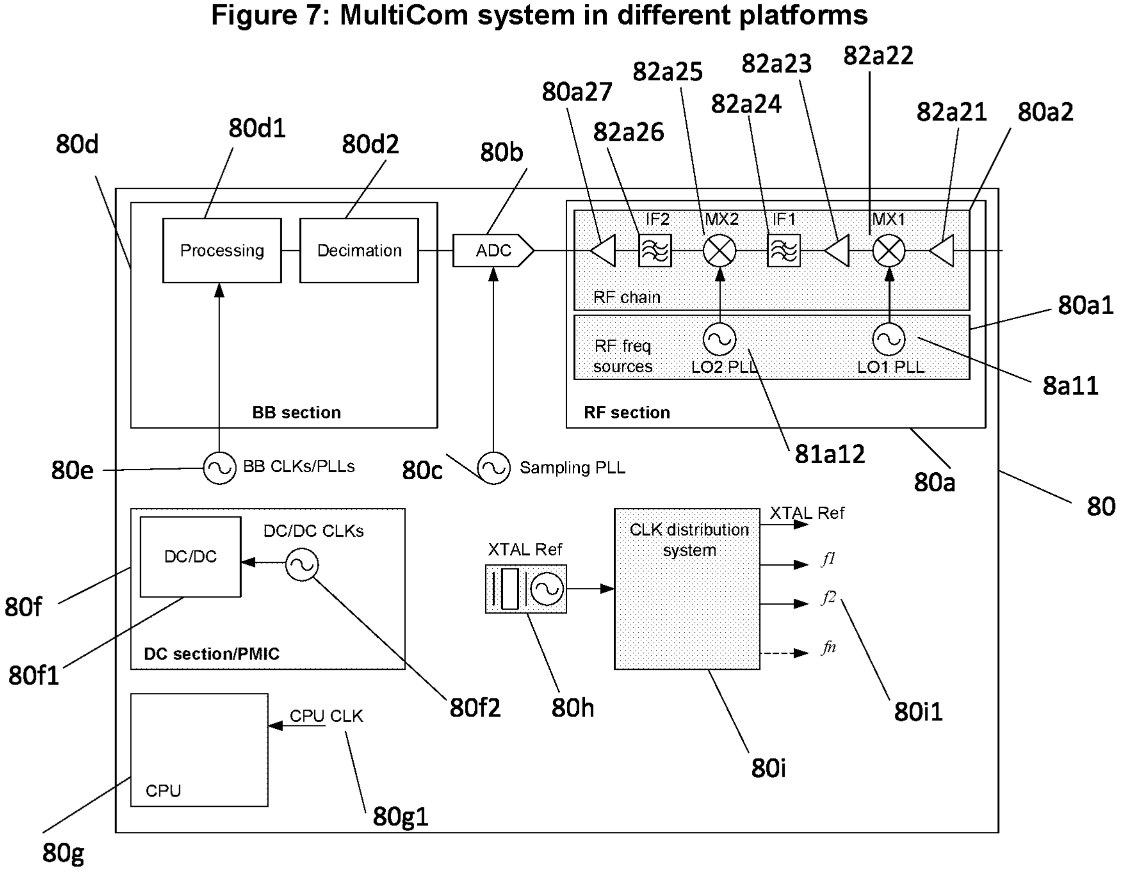
Figure 8: Frequency sources in victim or aggressor

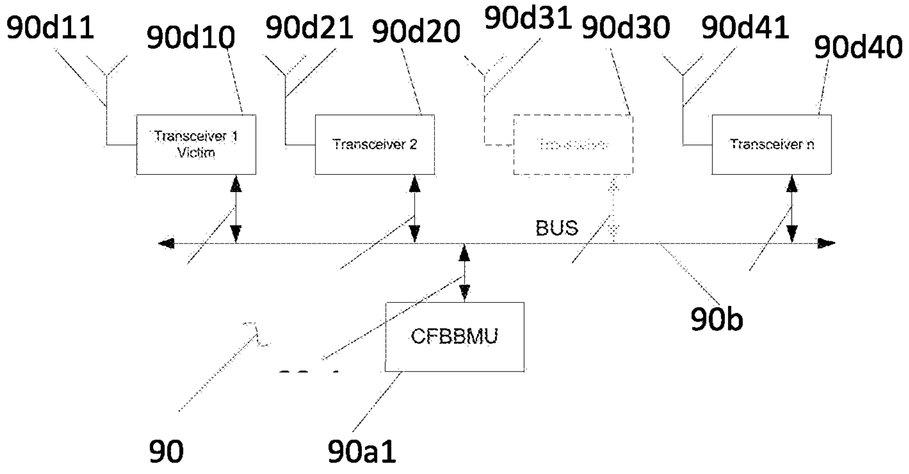
Figure 9: MultiCom system with CFBBMU
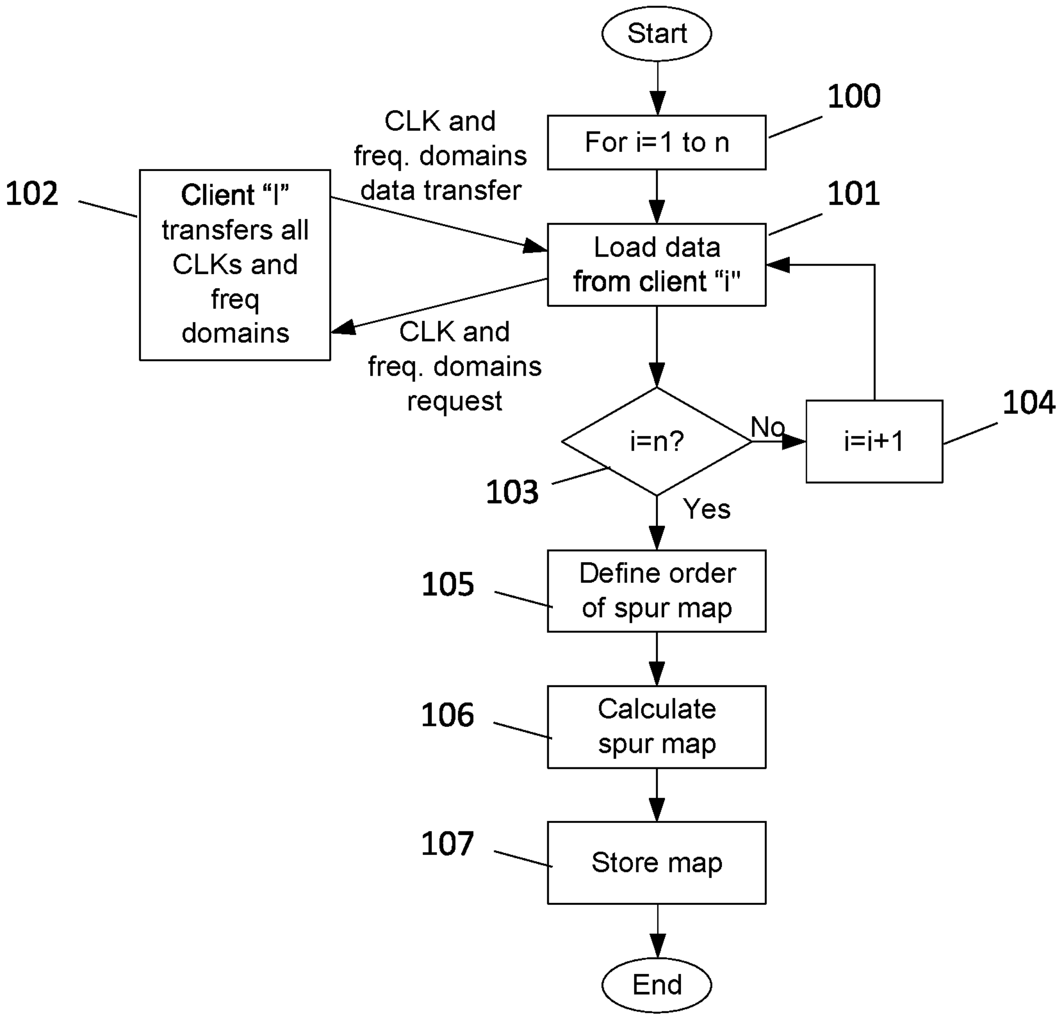
Figure 10: CFBBMU frequency discussion for spurious map generation

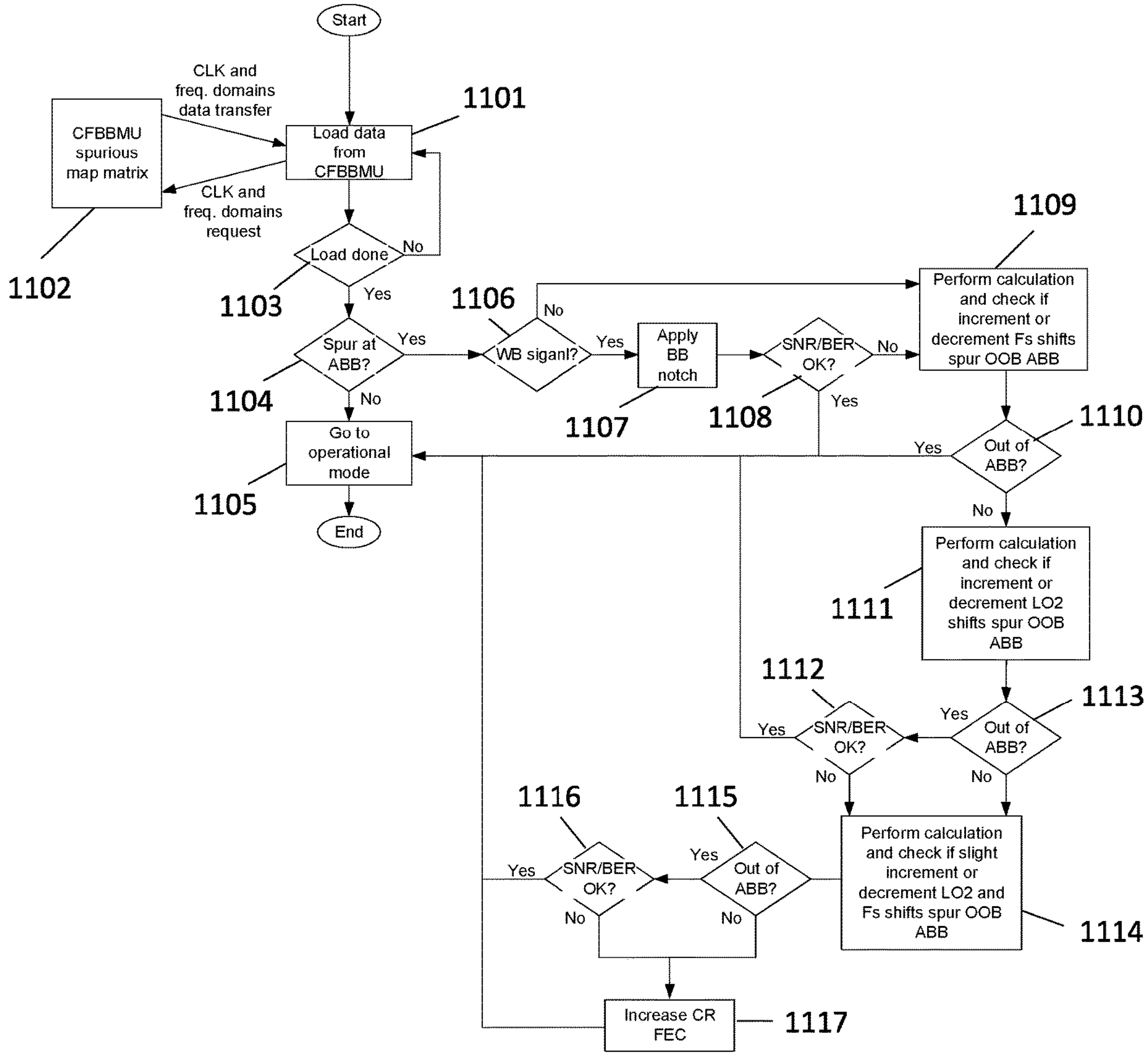
Figure 11: Client spurious mitigation local activity

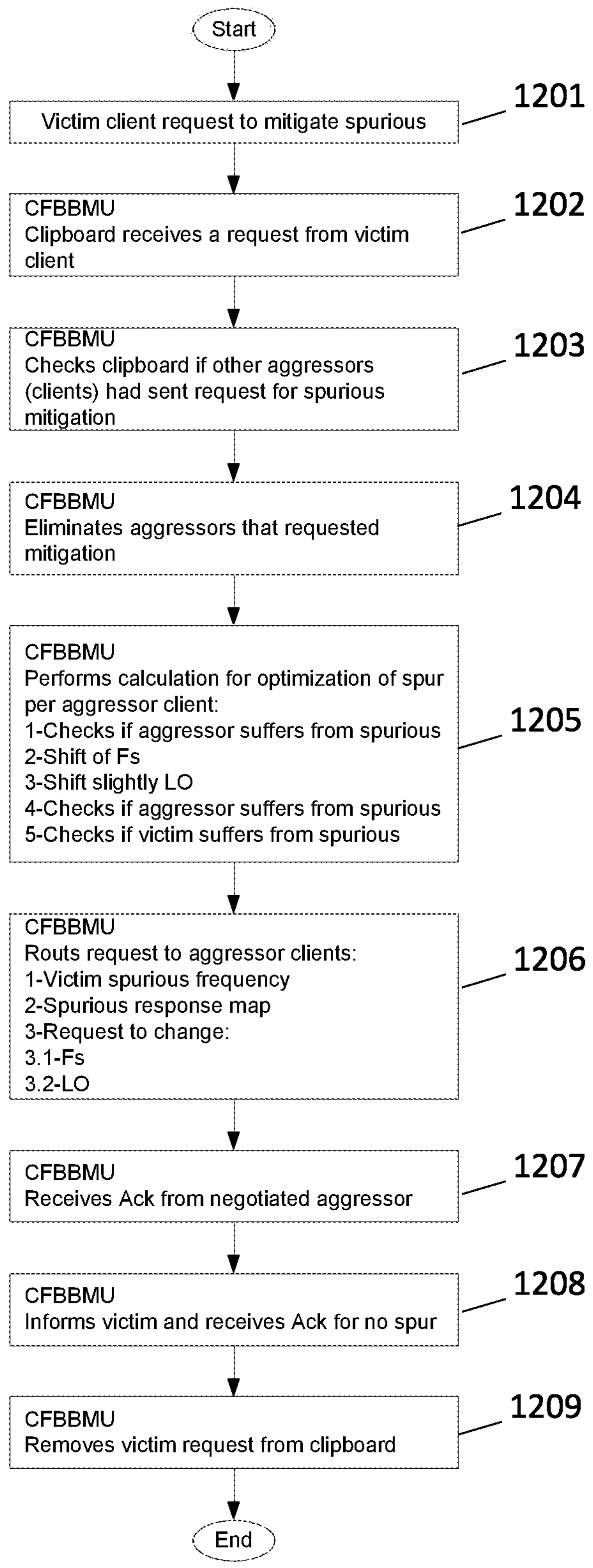
Figure 12: Example client discussion via CFBBMU for spurious mitigation

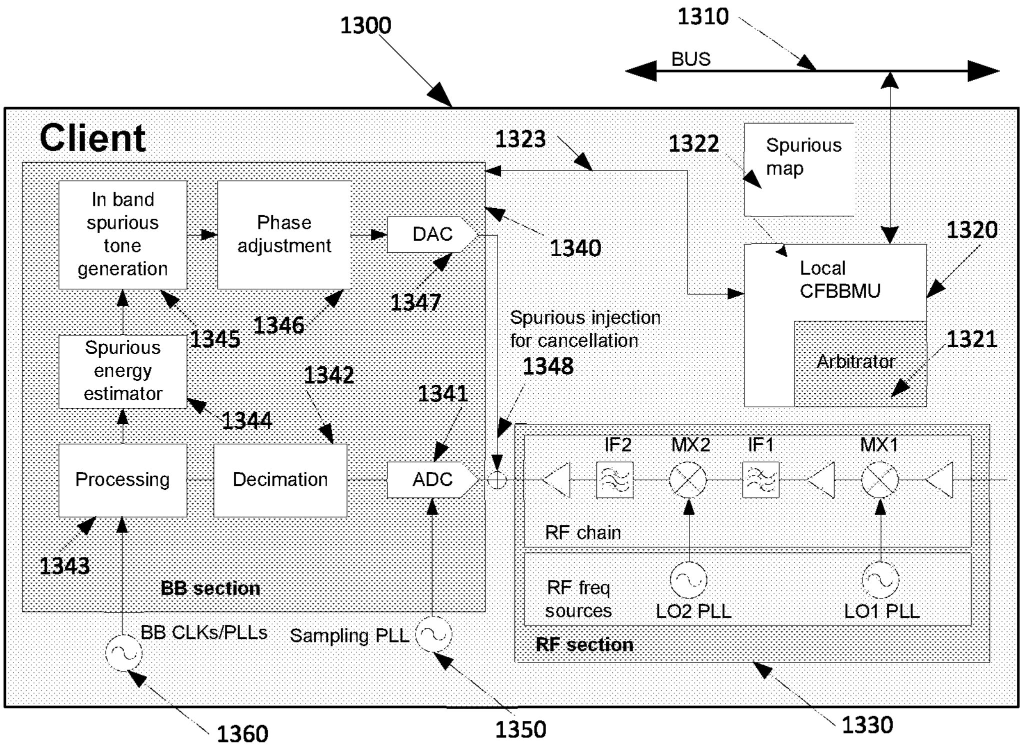
Figure 13: Example of spurious cancellation in victim client
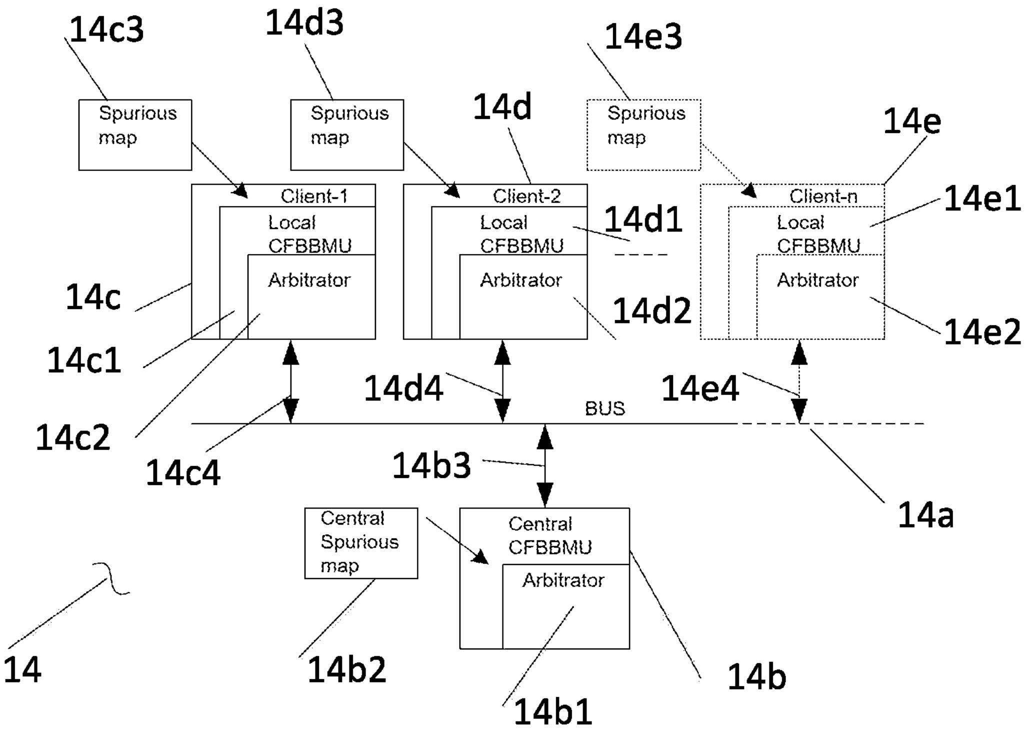
Figure 14: Generalized coexistence management architecture

METHOD AND SYSTEM FOR COEXISTENCE AND SPURIOUS MITIGATION IN MULTICOM PLATFORMS

CROSS REFERENCE TO RELATED APPLICATIONS

This application is a National Stage Application of International Application Number PCT/IL2022/050101, filed Jan. 25, 2022; which claims priority to Israeli Application No. 280438, filed on Jan. 26, 2021.

FIELD OF THE INVENTION

The present invention relates to the field of communication systems and generally to apparatus and methods for communications receivers, transmitters and transceivers interference mitigation. More particularly, the present invention relates to coexistence management and spurious products mitigation between aggressors and victims utilizing an efficient spurious products mapping algorithm and coexistence management architecture.

BACKGROUND OF THE INVENTION

A Multi-communication (herein MultiCom or MC) system comprises aggressors and victims where both victims and aggressors are referred to as clients. An aggressor is an emitter of an undesired signal or signals to either receiver or transmitter and, which generates undesired signals that reduce sensitivity in a receiver, as an example, or reduce spectral purity in a transmitter, as an example, where both susceptible sides receive (Rx) or transmit (Tx) are defined as victims. Generally, a victim is considered as a receiver.

Usually, MultiCom systems comprise clocks (CLK), local oscillators (LO), Intermediate frequencies (IF) and analog to digital and digital to analog converters (ADC/DAC), with sampling rates for each system, RF chains such as RF on board containing amplifiers, filters mixers or RF integrated circuits (RFIC), modulators demodulators (MODEM), central processing units CPU, memories, DC/DC converters and other hardware that require clocking. A major drawback of MultiCom systems is that it might generate a coexistence problem due to several reasons, such as spurious products, self-interference due to transmission and noise as an example.

The art constantly seeks new and improved ways to reject interfering spurious products, but it seems that no solutions exist up to date that efficiently detects interfering spurious products in a MultiCom system such as a multi-radio system. For example, many mitigation techniques focus on reducing but not detecting the interference before it reaches the receiver and not detecting the interference root cause frequencies, which can be used for diagnostics and mitigation.

It is an object of the present invention to provide a method and apparatus capable of providing coexistence management and spurious products identification management and mitigation in a victim receiver or victim transmitter and spurious products mitigation and management in aggressors.

Other objects and advantages of the invention will become apparent as the description proceeds.

SUMMARY OF THE INVENTION

The detailed description set forth below is intended to describe exemplary designs of the present invention and is not intended to represent the only designs in which the present invention can be practiced. The term "exemplary" is used herein to mean "serving as an example, instance or illustration". Any design described herein as "exemplary" is not necessarily to be constructed as preferred or advantageous over other designs. The detailed description includes specific details for the purpose of providing a thorough understanding of the exemplary designs of the present disclosure. It will be apparent to those skilled in the art that exemplary designs described herein may be practiced without these specific details. In some instances, well-known structures and devices are shown in a block diagram form in order to avoid obscuring the novelty of the exemplary designs presented herein.

A multi-communication (MC) system supporting a mitigation plan for interfering spurious products, comprising:

- at last one first client that is configured to perform wireless communication;
- at least one second client that is capable of generating spurious product that potentially interferes with said first client communication;
- a Clock-Frequency-BaseBand Management Unit (CFBBMU) module configured to repeatedly:
  - i. generates a spurious map based on data collected from one or more of said clients; and
  - ii. utilizes said generated spurious map to mitigate clients' interference.

According to an embodiment of the invention, the CFBBMU, comprising:

- A computation unit configured to generate the spurious map, wherein said generated spurious map is obtained by applying a systematic spurious mapping process on the collected data;
- A data-sharing clipboard for enabling clients to place a request to mitigate spurious products; and
- A memory for storing the generated spurious map.

According to an embodiment of the invention, the MC system further comprises an arbitrator to prioritize between clients request by:

- i. generating a priority map for clients requests;
- ii. utilizing said generated spurious map to mitigate clients' interference upon priority; and
- iii. granting client mitigation configuration upon priority.

According to an embodiment of the invention, the CFBBMU is configured to inform the first clients of the required mitigation based on pre-defined criteria. For example, a MC system such as a cellular phone where the primary transceiver is the cellular one. The second in the hierarchy as an example is the Wi-Fi, the third is GPS, and the last is the NFC. Hence the cellular radio requests are always in higher priority as an example.

According to an embodiment of the invention, the at least one first client is selected from a group consists of: a receiver, a transmitter, or a transceiver. In some embodiments, at least some of the first clients and some of the second clients are the same entity.

According to an embodiment of the invention, clients are receivers, transmitters or transceivers where all of the internal and peripheral frequencies are reported to CFBBMU. For example, peripheral frequencies are ADC sampling clocks (Fs), clocks, DAC sampling clocks (Fs) clocks, DC/DC switching rate clocks, CPU clocks, etc. For example, Local oscillators in RFIC chip or RF radio chain are internal sources. DC/DC switching and CPU clocks are peripheral sources out of the RF chain or RFIC but such that might generate spurious products. ADC clocks may be referred to as the internal clock of the digital section converting the analog signal into a bit-stream for the MODEM. It is understood by one skilled in the art that radio may have internal frequency sources and peripheral frequency sources external to the RF but such that might generate undesired spurious products.

According to an embodiment of the invention, clients report their configuration. For example, IF frequency is reported based on the desired channel to be received. IF center frequency and IF bandwidth (BW). Expected RF transmission frequency is reported as well as RF bandwidth. Local oscillator frequency settings are reported. The sampling rate of ADC and DAC is reported.

According to an embodiment of the invention, the CFBBMU is executed on one of the first clients or the second clients or on a separate unit and remotely communicates with the clients.

According to an embodiment of the invention, the data collected from the clients is selected from the group consisting of: data relative to clients' frequency settings, data relative to clients' configuration, clients' receivers' quality-of-service, clients' receivers' modulation code scheme, clients' receivers' code rate (CR), clients' receivers' targeted throughput or any combination thereof.

According to an embodiment of the invention, the clients communicate with the CFBBMU via an interface bus.

According to an embodiment of the invention, the CFBBMU collects frequency data setting from clients by polling.

According to an embodiment of the invention, the CFBBMU receives data from clients by client initiated transfer.

According to an embodiment of the invention, the CFBBMU receives data from clients by firmware (FW) during boot-load.

According to an embodiment of the invention, the collected data comprises data relative to configurations of clients.

According to an embodiment of the invention, the collected data is the receivers' quality-of-service (BER, FER, SNR, etc.) relative to configurations of clients.

According to an embodiment of the invention, the collected data is the receivers' modulation code scheme (MCS), such as (QPSK, QAM, etc.) refers to configurations of clients.

According to an embodiment of the invention, the collected data is the receivers code rate (CR) such as (1/3, 2/3, 1/2, etc.) refer to configurations of clients.

According to an embodiment of the invention, the collected data is the receivers' targeted throughput.

According to an embodiment of the invention, the arbitrator receives parameters from the CFBBMU, wherein the parameters are quality-of-service (QoS), MCS, CR, and net throughput.

According to an embodiment of the invention, the arbitrator performs optimized arbitration, wherein the optimized arbitration is by utilizing quality of service, MCS and CR, and spurious map data.

According to an embodiment of the invention, the arbitrator performs compromised arbitration, wherein the compromised arbitration is by compromised configuration rather than optimal configuration.

According to an embodiment of the invention, the arbitrator performs compromised arbitration, wherein the compromised arbitration is improving throughput with minimum configuration changes.

According to an embodiment of the invention, the arbitrator performs prioritized arbitration, wherein the prioritized arbitration is for the dedicated client (s) and compromises other clients based on the quality of service parameters, MCS and CR, by improving throughput with minimum configuration changes.

According to an embodiment of the invention, the arbitrator performs prioritized arbitration for the dedicated client (s), wherein said arbitration may be pre-defined by firmware or dynamically determined by one or more parameters, e.g., based on extremely poor QoS.

According to an embodiment of the invention, the CFBBMU is a central unit.

According to an embodiment of the invention, the arbitrator is a central unit within the CFBBMU.

According to an embodiment of the invention, the arbitrator is a central unit connected to the CFBBMU via a BUS.

According to an embodiment of the invention, the arbitrator is a central unit external to the CFBBMU.

According to an embodiment of the invention, the arbitrator is connected to CFBBMU and clines by a bus.

According to an embodiment of the invention, the arbitrator masks clients interrupts based on QoS and prioritize by non-masking based on QoS and other parameters.

According to an embodiment of the invention, the communication with the clients is for collecting data from clients' transceivers, receivers or transmitters.

According to an embodiment of the invention, collecting data from transceivers, receivers or transmitters comprises data relative to frequency settings of the client's transceivers, receivers or transmitters.

According to an embodiment of the invention, communication with the clients is to perform negotiations between clients.

According to an embodiment of the invention, a client's platform is Line Replaceable Units (LRU).

According to an embodiment of the invention, a client's platform is Lower Line Replaceable Units (LLEU).

According to an embodiment of the invention, a client's platform is Shop Replaceable Units (SRU).

According to an embodiment of the invention, clients are transceivers, receivers or transmitters.

The transceivers, receivers or transmitters can be selected from the group consisting of: system on chip (SoC), system in package (SiP), platform with multiple transceivers, or multiple transceiver chipsets on the same printed circuit board (PCB).

According to an embodiment of the invention, the CFBBMU can be a part of SoC or a part of each client.

According to an embodiment of the invention, the spurious map is selected from a group consists of: an overall map of interferences generated by internal sources of the clients, a map of a specific band of interest, and a spectrum map of all interfering signal products generated by all of the clients' sources.

According to an embodiment of the invention, the generation of the spurious map comprising a systematic spurious mapping process.

According to an embodiment of the invention, the spurious map is the overall map of interferences generated by internal and peripheral sources of all clients.

According to an embodiment of the invention, the spurious map is the spurious map of specific clients and specific bands herein "band of interest".

According to an embodiment of the invention, the specific client band of interest is a receive band (e.g., the receive band is a band with interference to the client).

According to an embodiment of the invention, the client is a victim interfered by other clients. Other clients may be referred to as aggressors.

According to an embodiment of the invention, a specific client band of interest is a transmit band. For example, the transmit band is a band interfered by other clients, and the specific client is a victim interfered by other clients. Therefore the specific client interfered by other clients may refer to as a victim. The other clients are referred to as aggressors.

According to an embodiment of the invention, the spurious map is a spectrum map of interference signal products generated by clients' sources, e.g., by all existing clients.

According to an embodiment of the invention, the request of a specific victim client to mitigate spurious products is a specific calculation produced from a global or local spurious map such as the victim's in-band spurious products map, and mitigation options are new frequency settings to minimize interference to the specific client.

According to an embodiment of the invention, global spurious products map is produced by calculation of all spurious products that might be generated from all clients' frequencies at a given system configuration.

According to an embodiment of the invention, a local spurious products map is produced by calculation of all spurious products that might be generated from all clients' frequencies at a given system configuration that might be within a specific band of interest of a specific victim client.

According to an embodiment of the invention, interference mitigation comprises new frequency settings. According to an embodiment of the invention, the new frequency settings can be in the victim client, in the aggressor client, or in both.

According to an embodiment of the invention, the systematic spurious mapping process comprises an efficient spurious mapping algorithm.

According to an embodiment of the invention, the part of each client enables clients to perform local mitigations without affecting other clients. For example, local mitigations without affecting other clients are obtained by applying notches to block spurious interferences. The notches can be band stop filters implemented in radio-frequency (RF) hardware (HW). According to an embodiment of the invention, the notches are band stop filters implemented in Base Band (BB) modem. According to an embodiment of the invention, local mitigations are implemented in the specific client RF HW. According to an embodiment of the invention, local mitigations are implemented in the specific client RF BB modem algorithms. According to an embodiment of the invention, local mitigations without affecting other clients are spurious cancellation algorithms. For example, the cancellation algorithms may involve the generation of out of phase signals from interfering signals. According to an embodiment of the invention, wherein the cancellation algorithms are generated locally by each client by BB processor or auxiliary BB processing or any other suitable means. According to an embodiment of the invention, local mitigations implementations are managed locally by each client by BB processor or auxiliary BB processing and the local CFBBMU or other means.

According to an embodiment of the invention, the internal and peripheral frequency sources of clients are selected from the group consisting of: local oscillators (LOs), ADC/DAC sampling CLKs, reference CLKs, DC/DC clocks, timing CLKs, CLK distribution outputs, etc.

According to an embodiment of the invention, internal and external frequency sources of clients refer to all frequencies setting at each request from the CFBBMU.

According to an embodiment of the invention, the communication is performed by one or more of the followings means: Bluetooth (BT), a global positioning system (GPS), frequency modulation (FM) radio, wireless fidelity (Wi-Fi), near field communications (NFC), radio frequency identification (RFID), long term evolution (LTE), (UMTS), (GSM) satellite communications (SATCOM), Wireless Universal Serial Bus (USB), 5G, 3rd generation (3G), WCDMA, CDMA, cognitive radio, direct sampling radio, interfaces to copper communications such as digital subscriber line (DSL) modem $I^2C$, coax, or any combination thereof.

According to an embodiment of the invention, each of the clients is selected from the list of Line Replaceable Units (LRU), Lower Line Replaceable Units (LLRU), Shop Replaceable Units (SRU), or any combination thereof.

According to an embodiment of the invention, the arbitrator provides a decision to change frequency configuration of a victim client and aggressor client in order to prevent interference by a spurious signal products within the victim band of interest.

According to an embodiment of the invention, the arbitrator provides a decision to mask interrupts from clients of the system.

According to an embodiment of the invention, interference mitigation comprises new frequency settings that refer to local oscillators (LOs), ADC/DAC sampling CLKs, reference CLKs, DC/DC clocks, timing CLKs, CLK distribution outputs, etc.

According to an embodiment of the invention, the arbitrator is a local victim client unit that configures locally new frequency settings based on exclusive needs of victim client without negotiations, wherein said arbitrator configured to arbitrate in favor of victim client.

According to an embodiment of the invention, the computation unit is an exclusive client that calculates a spurious map based on data from other clients.

According to an embodiment of the invention, the clipboard is a local messages board of the exclusive client.

According to an embodiment of the invention, the spurious map is calculated locally and exclusively for the exclusive client.

According to an embodiment of the invention, the spurious map is locally and exclusively for the exclusive client.

According to an embodiment of the invention, the CFBBMU is client exclusive.

According to an embodiment of the invention, the plurality of applications includes identifications or index. According to an embodiment of the invention, CFBBMU receives an identification index. According to an embodiment of the invention, the clipboard includes client identification or index.

In another aspect, the systematic spurious mapping process comprises an efficient spurious mapping algorithm that may involve the following functions:

Frequency sources vector with identification (ID) of each source (LO, ADC and the client it belongs);

Binary coded decimal (BCD) sign routine;

Harmonic permutation routine;

Spurious map routine; and

Band of interest spurious sort procedure;

According to an embodiment of the invention, the efficient spurious mapping algorithm receives by the CFBBMU the number of clients via the clipboard.

According to one aspect, an embodiment of the invention, the efficient spurious mapping algorithm receives by the CFBBMU the number of clients by polling using predetermined configuration in firmware (FW).

According to an embodiment of the invention, the efficient spurious mapping algorithm receives via the CFBBMU client identification.

According to an embodiment of the invention, the efficient spurious mapping algorithm receives via the CFBBMU number of frequency sources in each client.

According to an embodiment of the invention, the efficient spurious mapping algorithm tags each client frequency source with the client's identification for identifying of frequency source origin.

According to an embodiment of the invention, the frequency source origin is specific client local oscillators (LOs), ADC/DAC sampling CLKs, reference CLKs, DC/DC clocks, timing CLKs, CLK distribution outputs, etc.

According to an embodiment of the invention, the efficient spurious mapping algorithm produces a BCD matrix based on a number of clients' frequency sources.

According to an embodiment of the invention, the number of clients' frequency sources is the number of total frequency sources origins.

According to an embodiment of the invention, the total frequency sources origins is the client's local oscillators (LOs), ADC/DAC sampling CLKs, reference CLKs, DC/DC clocks, timing CLKs, CLK distribution outputs, etc.

According to an embodiment of the invention, the produced BCD matrix is a matrix with the size of $n \times 2^n$. According to an embodiment of the invention, n=number of total frequency sources.

According to an embodiment of the invention, n defines the number of columns of the BCD matrix and $2^n$ represents the number of rows of the BCD matrix.

According to an embodiment of the invention, the BCD sign routine has a BCD matrix containing "0" and "1".

According to an embodiment of the invention, the BCD matrix containing "0" and "1" is a matrix with the size of $2^n \times n$.

According to an embodiment of the invention, the BCD sign routine defines the sign as follows "0" is +1, "1" is −1 as an example or otherwise.

According to an embodiment of the invention, the efficient spurious mapping algorithm generates a sign matrix based on the BCD matrix.

According to an embodiment of the invention, the harmonic permutation is a matrix of frequency harmonics permutations between clients.

According to an embodiment of the invention, the harmonic permutation matrix routine receives via the CFBBMU harmonic order of clients' frequency sources.

According to an embodiment of the invention, the harmonic order of all frequency sources is a predetermined integer value "P" that defines the maximum frequency harmonics (system setup stored in the CFBBMU as an example).

According to an embodiment of the invention, the harmonic permutation routine is a procedure that generates the client's frequency sources and their harmonics permutations in a matrix.

According to an embodiment of the invention, the harmonics permutations in a matrix are all the harmonics combinations between all frequencies. It is the harmonic order of each frequency at a given combination. For example, is the following combination generating a spurious product is $3f_{LO,1}-2f_{ADC,1}-2f_{LO,2}+2f_{DAC,2}$ then the harmonics permutation matrix row of that specific combination is 3, 2, 2, 2 as explained later on. It is understood by one skilled in the art that there are several combinations; thus, there are several rows in the harmonics permutation matrix.

According to an embodiment of the invention, the harmonics permutations matrix contains values from 0 to P.

According to an embodiment of the invention, the harmonics permutations matrix is a matrix with the size of $((P+1)^n-1) \times n$ permutations. This matrix provides all possible harmonics combinations, including repetitions.

According to an embodiment of the invention in harmonics permutations matrix the number n defines the number of columns and $((P+1)^n-1)$ defines the number of rows and the −1 in the formulation is to remove all 0 harmonic case row.

According to an embodiment of the invention, n defines the number of total frequency sources from the clients.

According to an embodiment of the invention, the frequency sources vector with id is a column vector containing all frequency sources from all clients and client id attached to each frequency source.

According to an embodiment of the invention, the efficient spurious mapping algorithm generates the spurious map for each BCD matrix row sign combination.

According to an embodiment of the invention, the efficient spurious mapping algorithm generates the spurious map for each row of the BCD sign combination matrix. Overall there are $2^n$ sign permutations (combinations) rows and n columns in the BCD matrix of signs.

According to an embodiment of the invention, the efficient spurious mapping algorithm generates $2^n$ sign harmonics permutation (combinations) matrices. These matrices contain rows of harmonics values of each frequency, including signs According to an embodiment of the invention, the set of $2^n$ sign harmonics permutation matrices is generated by process of harmonics permutation matrix multiplication row by row with sign row of the sign matrix. The resulted matrices set is stored. According to an embodiment of the invention, wherein the multiplication process is performed with all of the sign matrix rows and the same harmonic permutation matrix. According to an embodiment of the invention, each sign row of the sign matrix multiplies each row of the cell by cell of the harmonics permutation matrix (harmonic combination matrix). According to an embodiment of the invention cell $A_{j,k}$ of the sign matrix multiplies cell $B_{j,k}$ of the harmonics permutation matrix (harmonic combination matrix) cell $A_{j,k+1}$ multiplies $B_{j,k+1}$ and so on till the end of the row, and then for the next row of harmonics permutation matrix $A_{j,k}$ multiplies $B_{j+1,k}$, $A_{j,k+1}$ multiplies $B_{j+1,k+1}$ and so on till the end of the matrix and then this process starts again for the next row of the sign matrix where cell $A_{j+1,k}$ of the sign matrix multiplies cell $B_{j,k}$, cell $A_{j+1,k+1}$ of the sign matrix multiplies cell $B_{j,k+1}$ and so on. According to an embodiment of the invention, the process results in $2^n$ sign harmonics permutation matrices defined as a set.

According to an embodiment of the invention, the harmonics permutations matrix size is $((P+1)^n-1) \times n$ for n frequencies columns and $(P+1)^n-1$ harmonics permutations (combinations) rows, this matrix may have an additional row (first row) which is an identifier containing clients' id tag and source type description where source type is local oscillators (LOs), ADC/DAC sampling CLKs, reference CLKs, DC/DC clocks, timing CLKs, CLK distribution outputs, etc. As an example, client number one LO frequency may be marked by a string such as $f_{LO,1}$ where f stands for frequency, please see Table 4 as an example of a spurious map.

According to an embodiment of the invention, a spurious frequency is obtained by multiplying all $2^n$ sign harmonics permutation matrices with a column frequency vector.

According to an embodiment of the invention, the column frequency vector is a vector of frequency sources from all clients in said system.

According to an embodiment of the invention, the result of the multiplication is 2n spurious vectors where each vector contains $((P+1)^n-1)$ spurious frequency cells.

According to an embodiment of the invention, the $2^n$ result vectors are concatenated with $2^n$ sign harmonics permutation matrices resulting in a global spurious map.

According to an embodiment of the invention, the global spurious map can be minimized by half by utilizing the BCD sign combination matrix symmetry.

According to an embodiment of the invention, the global spurious map is sorted by the algorithm located in the CFBBMU to the desired band of interest of a victim client.

According to an embodiment of the invention, the global spurious map can be used by the victim's, transmitter, receiver or transceiver, to tune a notch filter and thereby rejecting undesired spurious products.

In another aspect, the present invention relates to a method for interfering spurious signal products mitigation, comprising:

- providing at least one first client that is configured to perform wireless communication and at least one second client that is capable of generating spurious product that potentially interferes with said first client communication;
- repeatedly generating a spurious map based on the data collected from one or more of said clients; and
- utilizing said generated spurious map to mitigate clients' interference.

According to an embodiment of the invention, the method further comprises a sharing process of the generated spurious map with the clients in order to perform a local spurious signal interference mitigation.

According to an embodiment of the invention, the method further comprises informing said first clients of required mitigation based on pre-defined criteria.

According to an embodiment of the invention, the method further comprises the generation of the spurious map comprises a systematic spurious mapping process which comprises one or more of the following functions:

- building frequency sources vector with identification (ID) of each source (local oscillator (LO), Analog to digital converter (ADC) and the client it belongs);
- building Binary coded decimal (BCD) sign routine;
- building harmonic permutation matrix;
- generating spurious map routine; and
- generating a spurious sort procedure.

According to an embodiment of the invention, the BCD matrix is a matrix in size of $2^n \times n$, where n is defined as the number of the total frequency sources, wherein each entry of said matrix represents a sign.

According to an embodiment of the invention, the BCD matrix size can be optimized to a smaller size due to the symmetry of the BCD matrix.

According to an embodiment of the invention, the harmonic permutation matrix is a matrix of frequency harmonics permutations between clients, in size of $((P+1)^n-1) \times n$, where P is a predetermined integer value "P" that defines the maximum frequency harmonics, wherein each matrix entry is storing a value between 0 to P.

According to an embodiment of the invention, each sign row of the BCD matrix is activated on the overall permutation matrix resulting in a spurious generation as a combination of harmonic level and algebraic operation of addition and subtraction.

According to an embodiment of the invention, there are $2^n$ signed harmonic permutation matrices after applying the BCD matrix on the harmonic permutation matrix According to an embodiment of the invention, an efficient spurious map routine that generates the spurious map for each BCD matrix the signs combination row, results in a set of $2^n$ sign harmonics permutation matrices, which can be optimized utilizing symmetry of the BCD matrix.

According to an embodiment of the invention, the matrix of frequency harmonics permutations further comprises a row which is an identifier containing the clients' ID tag and source type, where source type may be local oscillators (LOs), ADC/DAC sampling CLKs, reference CLKs, DC/DC clocks, timing CLKs, CLK distribution outputs, or any frequency source thereof.

In another aspect, the invention relates to a non-transitory computer-readable medium comprising instructions, which, when executed by at least one processor, cause the processor to perform the method of the invention.

According to another aspect, the present invention is a Clock-Frequency-BaseBand Management Unit (CFBBMU), which is an exclusive standalone central implementation in a MultiCom system where its inputs are from all clients' transmitters, receivers, transceivers, and all frequency settings of clients' such Analog-to-Digital Converter (ADC) sampling clock (CLK) frequency (Fs), reference crystal (XTAL) frequency, switched power supply (DC/DC) frequency, LO frequency, IF frequency, RF frequency.

In another aspect, the present invention is a Clock-Frequency-BaseBand Management Unit (CFBBMU), which is an exclusive standalone implementation in an exclusive standalone receiver, transmitter or transceiver, herby standalone victim, where its inputs are the herby standalone victims' Analog-to-Digital Converter (ADC) sampling clock (CLK) frequency Fs, reference crystal (XTAL) frequency, switched power supply frequency, LO frequency, IF frequency, RF frequency.

According to another aspect, the CFBBMU can be an implementation in a MultiCom system where its inputs are the victims' (receiver, transmitter, transceiver) ADC sampling CLK frequency Fs, reference crystal (XTAL) frequency, switched power supply frequency, LO frequency, IF frequency, RF frequency in one hand, and ADC sampling CLK frequency Fs, DAC sampling CLK frequency Fs, reference crystal (XTAL) frequency, switched power supply frequency, LO frequency, IF frequency, RF frequency of the aggressor receivers, transmitters or transceivers on the other hand.

According to another aspect, the CFBBMU can be an implementation in MC system where the system is comprised from aggressors and victims in the same platform, such as a cellular user end (UE) unit.

According to another aspect, the CFBBMU can be an implementation in MC system where the system is comprised from aggressors and victims where each is an individual platform that has an electromagnetic coupling to other platforms.

According to another aspect, the CFBBMU can be an implementation in MC system where the system is comprised from aggressors and victims where each is an individual platform that have a conducted coupling to other platforms.

According to another aspect, the CFBBMU can be an implementation in MC system where the system is comprised from aggressors and victims where both are in an individual platform that has an electromagnetic coupling to other platforms.

According to another aspect, the CFBBMU can be an implementation in MC system where the system is comprised from aggressors and victims where both are individual platforms that have a conducted coupling to other platforms.

According to another aspect, the CFBBMU can be an implementation as part of automatic test equipment (ATE) to have an automatic pinpoint search of spurious products According to another aspect, the CFBBMU may be used as data source to optimize the victims' frequency plan to mitigate interfering spurious products by applying a baseband (BB) notch filter on expected spurious and therefore improving signal-to-noise ratio (SNR) of the Sampled Down Converted Input Signal (SDCIS).

According to another aspect, the CFBBMU may be used as a data source to optimize the victims' frequency plan to mitigate interfering spurious products by applying IF notch filter on expected spurious and therefore improving SNR and preventing compression of the SDCIS.

According to another aspect, the CFBBMU may be used as a data source to optimize the victims' frequency plan to mitigate interfering spurious products by slightly changing the ADC sampling frequency Fs to remove spurious products out of band.

According to another aspect, the CFBBMU may be used as a data source to optimize the victims' frequency plan to mitigate interfering spurious products by slightly changing victim LO frequency to remove spurious products out of band.

According to another aspect, the CFBBMU may be used as a data source to optimize the aggressors' frequency plan to mitigate interfering spurious products by slightly changing the ADC/DAC sampling frequency Fs to remove spurious products out of the victim's band.

According to another aspect, the CFBBMU may be used as a data source for optimizing the victims' frequency plan to mitigate interfering spurious products by slightly changing aggressors' LO frequency to remove spurious products out of band.

According to another aspect, the CFBBMU may be used as a negotiation center between clients such as victims and aggressors.

According to another aspect, the negotiation center between clients such as victims and aggressors is made by the ARBITRATOR within the CFBBMU According to another aspect, the negotiation center between clients various victims and to reconfigure the system in order to mitigate is made by the ARBITRATOR within the CFBBMU According to another aspect, ARBITRATOR may have a predetermined priority for each client request, and this means that mitigation of prioritized client will delay lower client request to the next phase or will provide a compromise setting rather than an optimal setting.

According to another aspect, clients can report CFBBMU SNR or BER or other parameters in order to provide efficient arbitration based upon reception quality.

According to another aspect, clients can report CFBBMU SNR or BER or other parameters in order to provide efficient frequency setting and compromised settings to lower priority clients based upon reception quality.

According to another aspect, the CFBBMU may generate the spurious map based upon all clients' frequency sources.

According to another aspect, the clients' frequency sources are local oscillators, (LOs), clocks (CLKs), IF frequencies, DC/DC clocks, ADC sampling clock, DAC sampling clock, received RF frequencies as an example.

According to another aspect, the CFBBMU spurious map may be any linear combination of frequency sources.

According to another aspect, clients are radio systems and their environments which are BB, ADC, synthesizers, CLKs and other HW of radio involving frequency generation.

According to another aspect, clients are radio systems and their environments which are BB, DAC, synthesizers, CLKs and other HW of radio involving frequency generation.

According to another aspect, victim clients can generate a cancelation tone to clear a mapped in band spurious products.

According to another aspect, victim clients that are transmitters can generate cancellation tones to prevent Tx spectrum contamination.

According to another aspect, victim clients that are receivers can generate cancellation tones to prevent Rx desensitization.

According to another aspect, victim clients that are receivers or transmitters are able to configure tunable notch filters to reject undesired spurious products generated based on CFBBMU spurious map.

In yet another aspect, the present invention relates to a non-transitory computer-readable medium sorting instructions that, when executed by a computer, cause the computer to:

- receive configuration of oscillators and CLK frequencies from all clients;
- receive tag names of all clients;
- receive victim's frequencies that required to be mitigated;
- generate a spurious map based on the configuration, tag names, and victim frequencies inputs from clients and level of harmonic of the mapping;
- generate cancellation signals for clients;
- receive interrupts from high priority clients (e.g., the interrupts may be used to optimize and mitigate high priority clients); and
- performing an arbitration between clients.

It is understood that additional aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWINGS

FIG. 1 illustrates the creation process of data 3D harmonic permutation, according to an embodiment of the present invention;

FIG. 2 depicts the data loaded during the initialization phase from MC to ATE station or to a CLK, frequency and baseband (BB) management unit (CFBBMU). The data is containing a number of frequencies sources where each source has a tag defining the function that generates the source (ADC, DAC, LO, etc.) and the client identification (A, B, C, etc.), according to an embodiment of the present invention;

FIG. 3 depicts the process of generating the sign matrix, according to an embodiment of the present invention;

FIG. 4 depicts an example of a band of interest search process, according to an embodiment of the present invention;

FIG. 5 illustrates an example of the main program process, according to an embodiment of the present invention;

FIG. 6 illustrates an example of a MultiCom (MC) system, according to an embodiment of the present invention;

FIG. 7 illustrates an example of transceivers sharing a common bus, according to an embodiment of the present invention;

FIG. 8 illustrates an example of frequency sources in a victim or aggressor that are reported to the CFBBMU, according to an embodiment of the present invention;

FIG. 9 illustrates a bus being used for transferring from each transceiver (client) data to the CFBBMU, according to an embodiment of the present invention;

FIG. 10 demonstrates an example of a process where each client transfers configuration data to the CFBBMU by the initiated request of CFBBMU for processing and producing the spurious products map, according to an embodiment of the present invention;

FIG. 11 demonstrates an example of data pull from CFBBMU by a client which performs interference mitigation, according to an embodiment of the present invention;

FIG. 12 is a flowchart showing how the CFBBMU works as an arbitrator to impose settings on clients according to a victim client request to mitigate spurious (i.e., victim message on the clipboard), according to an embodiment of the present invention; and FIG. 13 illustrates an example of a client victim that uses dedicated BB hardware (HW) for spurious products cancellation, according to an embodiment of the present invention.

FIG. 14 illustrates an example of a generalized concept of a coexistence management approach, according to an embodiment of the present invention.

DETAILED DESCRIPTION

A method and apparatus for detecting interfering spurious products generated in a Multi-Communication (herein: MultiCom or MC) system such as multi-radio system, and mitigation method and apparatus to reject interfering spurious products.

Throughout this description, the terms "MultiCom" or "MC" are used to indicate a Multi-communication system that essentially comprises transmitters and receivers. This term does not imply any particular communication system, and the invention is applicable to all suitable multi-communication systems.

The transmitter comprises a Digital to analog converter (DAC), clocks (CLKs) such as timing CLK for DAC, synthesizer reference CLK, DC/DC CLK, and any other timing CLK. CLK is an oscillator which may be an ordinary oscillator, crystal oscillator etc; local oscillators (LOs) used for frequency up-conversion, where LO can be implemented by a synthesizer phase lock loop (PLL) locked on a reference CLK; mixers used for frequency conversion, amplifiers, filters, and an antenna.

The receiver comprises Analog to digital converter (ADC), clocks (CLKs) such as timing CLK for DAC, synthesizer reference CLK, DC/DC CLK and any other timing CLK. CLK is an oscillator which may be an ordinary oscillator, crystal oscillator, etc.; local Oscillators (LOs) used for frequency up-conversion, where LO can be implemented by a synthesizer Phase Lock Loop (PLL) locked on a reference CLK; mixers used for frequency conversion, amplifiers, filters, and an antenna.

MC system is not limited to classic transmitters and receivers, and it may comprise direct sampling transmitters and receivers as well as cognitive radio transceivers. It may contain any other means of communications, such as fiber optical digital transport, RF over Fiber (RoF), and computation circuits such as FPGAs, and CPUs which require timing CLKs.

An MC system may be any platform containing communications and "measurement-radio" (measurement radio example is a RADAR application in a 60 GHz WiGig mobile phone, i.e., 60 GHz Wi-Fi) system such as cellular, LTE5G, Wi-Fi, WiGig, Bluetooth, near field, Radar, Altimeters, digital fiber optics link as an aggressor, RoF, or any radio system that is integrated within a system platform.

An aggressor is an emitter of an undesired signal or signals to either receiver or transmitter, and which generates undesired signals that reduce sensitivity in a receiver, as an example, or reduces spectral purity in a transmitter as an example. Generally, the victim is the susceptible side, which can be a receiver (Rx), transmitter (Tx) or a transceiver. Generally, in most cases, a victim is considered as a receiver.

In one aspect, a victim comprises an input signal, amplification down conversion and sampling the down converted input signal to generate Sampled Down Converted Input Signal (SDCIS). In another aspect, a victim comprises a direct sampling of an input signal with tunable notches and amplifications. In other aspects, a victim can be a cognitive receiver concept.

According to an embodiment of the invention, coexistence spurious mitigation system has a central database containing all of the systems active clocks (CLK) and frequency sources such as: victim clocks and frequency sources (for example; ADC clock DAC clock, CPU clock, DSP clock, DC/DC switched power supply operating frequency, reference crystal (XTAL) TCXOs, local oscillators (LO) and any other frequency source utilized by the receiver) and other frequency sources of aggressors such as receivers, transmitters or transceivers (for example, aggressors frequency sources can be; ADC clock DAC clock, CPU clock, DSP clock, DC/DC switched power supply operating frequency, reference crystal (XTAL).

CLK, frequency and baseband (BB) management unit is denoted as CFBBMU. Each client, where client, for example, is a radio system, provides data to CFBBMU and can pull out data from CFBBMU and calculate a spurious map. Alternately, the CFBBMU can calculate spurious map, which can be pulled by clients. In this manner, each client can optimize its frequency setting, its filters configuration in BB or to conduct negotiations with other clients to find an overall system optimum. Negotiations can be done via the CFBBMU.

Reference will now be made to several embodiments of the method and apparatus for providing coexistence management and spurious products identification management and mitigation in a victim receiver or victim transmitter and spurious products mitigation and management in aggressors, examples of which are illustrated in the accompanying figures. The figures depict embodiments of the present invention for purposes of illustration only. One skilled in the art will readily recognize from the following description that additional embodiments of the structures and methods illustrated herein may be employed without departing from the principles of the invention described herein.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media that facilitate transfer of a computer program from one place to another. A storage media may be any available media that can be accessed by a computer. By way of example, and not limitation, such computer-readable media can comprise RA, ROM, EEPROM, CD-ROM or any optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or another remote source using a coaxial cable, fiber optic cable, twisted pair, digital subscriber line (DSL), or wireless technologies such as infrared, radio, and Microwave, then the coaxial cable, fiber optic cable, twisted pair, DSL or wireless technologies such as infrared, radio, and microwave are included in the definition of the medium. Disk and disc, as used herein, includes compact disc (CD), laser disc, optical disc, digital versatile disk (DVD), floppy disk and Blu-ray disc where disks usually reproduce data magnetically, while discs reproduce data optically with lasers. Combinations of the above should also be included within the scope of computer-readable media.

Description of Spurious Search Algorithm

Spurious products sources seen at Transceiver-A and Transceiver-B arise from Transceiver-A XTAL, PLL, ADC sampling CLK, DAC sampling CLK LO, and IF as well Transceiver-B XTAL, PLL, ADC sampling CLK, DAC sampling CLK, LO and RF out. If we assume that the DAC and ADC sampling rates are the same, then the DAC sampling CLK is omitted.

The linear combination of all frequencies can be written as follows:

$$f_{spur} = \left| \pm m \times IF_{Transceiver\ A} \pm n \times CLK_{Transceiver\ A\_ADC} \pm j \times PLL_{Transceiver\ A} \pm k \times XTAL_{Transceiver\ A} \pm g \times LO_{Transceiver\ A} \pm l \times RF_{Transceiver\ B} \pm r \times CLK_{Transceiver\ B\_ADC} \pm s \times PLL_{Transceiver\ B} \pm u \times XTAL_{Transceiver\ B} \right| \quad \text{Equation 1}$$

Where, low case letters are harmonics indices.

The aim of the spurious products analysis is to find undesired products falling within the band of Transceiver-A Rx and Transceiver-B Rx, as well as products that might fold in due to the ADC/DAC sampling CLKs and thereby contaminate the spectrum. These conditions define the solution domain of Equation 1. Bear in mind that this is a multi-radio environment hence there is mutual leakage of signals between two radios. Thus nonlinear effects operate on both local and leaking signal, yielding the linear combination of all frequencies expression of Equation 1.

Equation 1 can be written in a more general way for a MultiCom system where the number of transceivers is larger than 2 and where ADC and DAC sampling frequencies (Fs) are not equal.

Characterize Spurious Sign Combination with Binary-Coded Decimal (BCD)

Observing Equation 1 there are two states for each term, and overall there are nine terms. Hence there are $2^9$ sign states. These states can be mapped as BCD code where each digit defines a sign, for example, '0'='−' and '1'='+'. Hence the combination 0110 means as an example: −n×A+m×B+j×C−k×D where x is a multiplication sign.

The number of digits defines the number of fundamental frequencies that require harmonic calculation (herein harmonic loops). Harmonic order is user defined upon need. Hence in the given example of 0110, there are four harmonic loops. Since loops and nesting is not an efficient code, the calculation is performed by matrices and combinatory; the term harmonic loops is just for description convenience.

Based on these concepts, each sign state or BCD code is scanned for harmonics.

In this example, there are 24 sign states, resulting in 16 states, and each state has four harmonic loops. If the requirement is to examine spurious products up to the $5^{th}$ harmonic, then there are $5^4$ harmonic states for each BCD code. Thus for the case demonstrated in Equation 1, there are $5^9$ harmonic states for each BCD code. Hence the total spurious map size is $10^9=2^9\times5^9$. If we include harmonic state 0, the number increases to $12^9-1=2^9\times6^9-1$. This modification is since the harmonics count of 1, 2, 3, 4, 5 becomes 0, 1, 2, 3, 4, 5, but the state of all harmonic order are equal to zero simultaneously is ignored (all equal to zero means no signal). Hence the generalized harmonics states expression for all sign states is $2^n((P+1)^n-1)$ The concern is of those spurious products that are in a band for quality of service and those that contaminate spectrum and violate the FCC requirements.

The spurious map can be optimized and minimized based on BCD, and certain codes can be deleted from the list.

Efficient Method for Spurious Mapping

Generally, the loop approach solution for spurious products mapping consumes plenty of time, resources and is inadequate to a MultiCom system that must produce fast real-time (RT) spurious map in the CLK, frequency and baseband (BB) management unit (CFBBMU).

MATLAB (matrix laboratory) is a matrix brand software tool, and thus lends itself well to spur mapping algorithm, other methods of obtaining spurious matrices are applicable as well. It is recommended to avoid loops. Firmware (FW) will be more efficient using matrices rather than loops.

The BCD matrix defines the signs between frequencies. For n frequencies $f_1, f_2, f_3, \ldots f_n$, there are $2^n$ states as there are n digits (frequencies). Therefore the BCD matrix rank is $2^n\times n$ as shown in FIG. 1 item 1*a*. The associated SIGN matrix has the same rank. The SIGN matrix cells are "1" and "−1" for "0" logic and "1" logic in the BCD matrix, respectively. The harmonics are examined too. Assuming the highest harmonic is P, then there are P+1 cases of harmonics for each frequency since 0 is included too. 0 is used to indicate that the harmonics of certain frequencies are not counted. For n frequencies $f_1, f_2, f_3, \ldots f_n$, there are $(P+1)^n$ harmonic states as there are n digits (frequencies), and according to combinatorial multiplication rule, there are $(P+1)^n$ permutations. Therefore the harmonics matrix rank is $((P+1)^n-1)\times n$, as shown in FIG. 1, item 1*c*. The combination of all frequencies equal to zero is excluded from the matrix since it indicates there is no signal at any frequency.

The frequency vector dimension for n frequencies $f_1, f_2, f_3, \ldots f_n$ is n×1.

Using the above matrices, a three-dimensional (3D) harmonic permutation matrix is created according to the following process, where each matrix in the cube is defined as a page, see FIG. 1.

1. Each row of the SIGN matrix multiplies cell by cell the harmonics permutation matrix to form a new matrix named harmonics_sign matrix. The rank of harmonics_sign matrix is $((P+1)^n-1)\times n$ see FIG. 1 items 1*b* and 1*c*.
2. Since there are $2^n$ rows in the SIGN matrix there are $2^n$ harmonics_sign matrices organized in a 3D matrix called harmonics_cube. The rank of the harmonics_cube matrix is $((P+1)^n-1)\times n\times2^1$ see FIG. 1 item 1*d*.

3. The spurious products frequency is obtained by multiplying the harmonics_cube matrix (FIG. 1 item 1*f*) with the frequency vector (FIG. 1 item 1*e*). The result is a spurious products frequency is a number which is the corresponding spurious products frequency of a given row of the harmonics sign matrix page within the harmonics cube matrix.
4. Repetition of the above process for each row of the harmonic sign matrix at a given page will result in a spurious products vector for that specific page. Repetition of this process for the entire signed harmonics cubic matrix will result in $((P+1)^n-1)\times1\times2^n$ spurious vectors, as demonstrated in FIG. 1, items 1*e*, 1*f* and 1*g*.
5. The rank of harmonics cube matrix is $((P+1)^n-1)\times n\times2^n$ (FIG. 1 item 1*f*), thus $((P+1)^n-1)\times1\times2^n$ spurious frequencies are computed (FIG. 1, item 1*g*).
6. Concatenation of the harmonics cube matrix with the computed spurious frequencies provides the spurious map as depicted in FIG. 1 item 1*h*, 1*i* and 1*j*.
7. Sorting can be done to find spurious products frequencies within the band of interest and identifying their sources. The list is exported in excel format in the ATE station or to the CFBBMU spurious map memory, as demonstrated in the example of FIG. 4.

MATLAB analysis of 5 frequencies (ADC CLK, DAC CLK, LO, IF, Ref) and harmonics of up to the $5^{th}$ order is performed. Harmonics permutation matrix size is 7775×5, BCD and SIGN matrices size is 32×5, cubic matrix size is 7775×5×32. The calculation time is ~0.75 sec. Exporting the spurious map to Excel and sorting for the band of interest adds another ~6.5 sec. Performing this process in hardware, the firmware is much faster.

The above numerical example, which is also described in FIG. 1, can be illustrated by the following example Equation 2 to Equation 7 (in this example, "0"="+" and "1"="−"); We do not show here all the permutations rows of the BCD signs. We just show the logic by demonstrating a few rows of this matrix for the sake of explanation.

$$BCD = \begin{bmatrix} 0&0&0&0&0 \\ 0&0&0&0&1 \\ 0&0&0&1&0 \\ 0&0&0&1&1 \\ 0&0&1&0&0 \end{bmatrix} \Rightarrow \text{Sign} = \begin{bmatrix} 1&1&1&1&1 \\ 1&1&1&1&-1 \\ 1&1&1&-1&1 \\ 1&1&1&-1&-1 \\ 1&1&-1&1&1 \end{bmatrix} \quad \text{Equation 2}$$

$$Har = \begin{bmatrix} 0&0&0&0&1 \\ 0&0&0&0&2 \\ 0&0&0&0&3 \\ 0&0&0&1&0 \\ 0&0&0&1&1 \\ 0&0&0&1&2 \\ 0&0&0&1&3 \\ 0&0&0&2&0 \\ 0&0&0&2&1 \\ 0&0&0&2&2 \end{bmatrix} \quad \text{Equation 3}$$

$$f = \begin{matrix} f_{ADC,1} \\ f_{LO,1} \\ f_{IF,1} \\ f_{DAC,2} \\ f_{LO,2} \end{matrix} \quad \text{Equation 4}$$

$$(HarSign)_i = (Har).\times(\text{Sign})_{i,j=1 \ldots n} \quad \text{Equation 5}$$

-continued $$\text{Har\_Sign}_{Page\_2} = \begin{bmatrix} 0&0&0&0&-1 \\ 0&0&0&0&-2 \\ 0&0&0&0&-3 \\ 0&0&0&1&0 \\ 0&0&0&1&-1 \\ 0&0&0&1&-2 \\ 0&0&0&1&-3 \\ 0&0&0&2&0 \\ 0&0&0&2&-1 \\ 0&0&0&2&-2 \end{bmatrix} \quad \text{Equation 6}$$

$$(Spur)_i = (HarSign)_i \times (\bar{f}) \quad \text{Equation 7}$$

Equation 2 shows how the BCD matrix is converted to a Sign Matrix. Equation 3 shows the harmonics permutation matrix, this is a matrix with the same number of columns as the BCD matrix representing five frequency sources in this example. Equation 3 demonstrates the harmonics permutation matrix, the number of harmonics is P=3 hence including the zero order P+1=4. Hence there are $4^5-1=1023$ rows overall, all zeros row is removed. We do not show here all of the permutations rows of the harmonics, we just show the logic by demonstrating a few rows of this matrix for the sake of explanation. Equation 4 shows the frequency sources vector of MultiCom clients (two clients and the frequency source name). Equation 5 shows the cell by cell multiplication of each row. In this case, Har matrix is multiplied cell by cell by row i of the Sign matrix. ( ). operator as in MATLAB. There are $2^5$ Harmonic Sign matrices.

Equation 6 shows the result of multiplying row 2 of the sign matrix in Equation 2 with the harmonics permutation matrix in Equation 3. The result is a page of the cubic sign matrix.

Equation 7 shows the spurious vector calculation.

Reducing the Number of Sign Permutations

The above computation provides data results with redundancy. The reason is that the spurious frequency is calculated by taking the absolute value of the interaction between frequencies permutations, as in Equation 1, for example, assume a=1; $f_1=1$, b=2; $f_z=2$, c=3; $f_3=3$ then it is clear that $|af_1+bf_2+cf_3|=|-af_1-bf_2-cf_3|$ Observing the BCD matrix, used to generate the sign matrix, it is has a logical "NOT" symmetry as shown in Table 1 and Table 2 (row 0 is the NOT of row 7, row 1 is the NOT of row 6, etc.), the symmetry is demonstrated by the gray color scale; now pairs with the same gray color are the NOT symmetry. Therefore, the frequency result for a given harmonic state, for example, using the sign operation in row 0 equals to the one in row 7, is as shown in Table 2. As a consequence, the size of the cubic matrix depicted in FIG. 1 is reduced to $2^{n-1}$. Note that in this example "0"="−" and "1"="+". It is an arbitrary free definition choice.

TABLE 1

BCD code logical "NOT" symmetry

| # | f1 | f2 | f3 |
|---|---|---|---|
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |

TABLE 1-continued

| BCD code logical "NOT" symmetry | | | |
|---|---|---|---|
| # | f1 | f2 | f3 |
| 5 | 1 | 0 | 1 |
| 6 | 1 | 1 | 0 |
| 7 | 1 | 1 | 1 |

TABLE 2

| BCD code logical sign symmetry | | | |
|---|---|---|---|
| # | f1 | f2 | f3 |
| 0 | −1 | −1 | −1 |
| 1 | −1 | −1 | 1 |
| 2 | −1 | 1 | −1 |
| 3 | −1 | 1 | 1 |
| 4 | 1 | −1 | −1 |
| 5 | 1 | −1 | 1 |
| 6 | 1 | 1 | −1 |
| 7 | 1 | 1 | 1 |

It can be seen that symmetry exists in the harmonics permutations matrix as well. However, since harmonics coefficients are applied on different frequencies, which are unequal variables, the harmonics permutation states reduction is not applicable as demonstrated in Table 3 (0 order harmonic is not shown).

TABLE 3

| Harmonics permutation symmetry | | | | | | | | | |
|---|---|---|---|---|---|---|---|---|---|
| # | f1 | f2 | f3 | f1 | f2 | f3 | f1 | f2 | f3 |
| 1 | 1 | 1 | 1 | 2 | 1 | 1 | 3 | 1 | 1 |
| 2 | 1 | 1 | 2 | 2 | 1 | 2 | 3 | 1 | 2 |
| 3 | 1 | 1 | 3 | 2 | 1 | 3 | 3 | 1 | 3 |
| 4 | 1 | 2 | 1 | 2 | 2 | 1 | 3 | 2 | 1 |
| 5 | 1 | 2 | 2 | 2 | 2 | 2 | 3 | 2 | 2 |
| 6 | 1 | 2 | 3 | 2 | 2 | 3 | 3 | 2 | 3 |
| 7 | 1 | 3 | 1 | 2 | 3 | 1 | 3 | 3 | 1 |
| 8 | 1 | 3 | 2 | 2 | 3 | 2 | 3 | 3 | 2 |
| 9 | 1 | 3 | 3 | 2 | 3 | 3 | 3 | 3 | 3 |

All the above will be better understood through the following illustrative and non-limitative examples. Unless otherwise indicated, the functions described herein may be performed by executable code and instructions stored in a computer-readable media and running on one or more processor-based systems. However, state machines and/or hardwired electronic circuits can also be utilized. Furthermore, with respect to the example processes described herein, not all the process states need to be reached, nor do the states have to be performed in the illustrated order. In addition, certain process states that are illustrated as being serially performed can be performed in parallel.

This section provides a flow chart guide for the realization of spurious mapping as an example. This method can be implemented in a MultiCom system (MC) or automatic test equipment (ATE) station to pass FCC requirements as an example.

In this example of an MC, a tester will sweep for spurious in two modes, first when the companion chip is off. In this manner, self-produced spurious products are captured at the victim receiver as an example. Using the spurious map, the spurious origin is identified, and characterization of receiver and mitigation solutions are generated.

Next, all companion chips are enabled, all CLKs frequencies are loaded and coexistence spurious products are measured. Spurious mitigation in the victim is updated to minimize interference.

Initialization

FIG. 2 schematically illustrates the data loaded during the initialization phase from MC to ATE station or CLK, frequency and baseband (BB) management unit (CFBBMU) containing a number of source frequencies of each source. Additionally, the channel under test is defined by its BW and center frequency. Data is collected by the CFBBMU from all clients by polling, or it may be an initiated transfer by clients to the CFBBMU. In this example, an initialization procedure 20 may involve the following steps:

Defining a number of signals n such as $LO_A$, $IF_A$, $CLK_{ADC\_A}$, $XTAL_A$, $LO_B$, $RF_B$, $CLK_{ADC\_B}$, $XTAL_B$ (step 21);

Defining the frequency of each signal (step 22); and

Defining bands of interest by determining the Ch frequency and its BW (step 23).

It is understood that other aspects will become readily apparent to those skilled in the art from the following detailed description, wherein various aspects are shown and described by way of illustration.

BCD

FIG. 3 schematically illustrates the process of generating the sign matrix based on frequency data loaded from the MC to the ATE station or CLK, frequency and baseband (BB) management unit (CFBBMU). The number of frequencies n defines 2n combinations of "0" and "1". In this example, the sign per BCD code process 30 may involve the following steps:

Defining all BCD codes $2^n$ (step 31); and

Defining the sign for each signal frequency per BCD code "0"=−; "1"=+ (step 32). For example, 01011 is −f1+f2−f3+f4+f5).

It is understood that additional aspects will become readily apparent to those skilled in the art from the following detailed description, wherein various aspects are shown and described byway of illustration.

Band of Interest

FIG. 4 schematically illustrates an example of a search process in a "Band of Interest" as indicated by blocks 41-50 in the figure. This is a process of narrowing the spurious search to a specific band or group of bands. The process is an example of scanning the spurious matrix produced by the CLK, frequency and baseband (BB) management unit (CFBBMU). The process starts at block 41 by loading channels and BW (number of bands of interest). At this stage, the channel index and the BW index are set to 1 (i.e., chindex=1 and BW_INDEX=1, as indicated by blocks 42 and 43). Start and stop frequencies are defined per band definition (blocks 44, 45), where spurious products frequency conditions are examined (block 46—running spurious mapping sweep and record results, blocks 47, 48—checking if BW_INDEX ends, if no, increasing BW_INDEX or ChINDEX by 1 as indicated by blocks 49 and 50 respectively), for example, in an Rx band of GSM, UMTS, LTE, GPS, etc. At the other extreme, the band of interest can be the entire spectrum of a spectrum analyzer (SA) for a global emission report in an ATE station for FCC approval; in that case, the whole spurious matrix is examined.

As an example, the band of interest can be processed by the CFBBMU where a client sends the relevant Rx band definition and receives the spurious map. Based on this map client can mitigate the spurious products with a notch filter.

Alternately, the client may receive the whole spurious map from the CFBBMU and calculate the spurious map in the relevant operating band. Apply mitigations such as notch; adjust the sampling rate of the ADC and the DAC etc.

The concept demonstrated, in this case, is a channel defined by the client center frequency and BW. Thus the center frequency and half BW define the start and stop frequencies according to Equation 8. Alternately, start and stop frequencies can be defined explicitly.

$$f_{start} = f_{cf} - BW/2 \qquad \text{Equation 8}$$

$$f_{stop} = f_{cf} + BW/2$$

It is understood that additional aspects will become readily apparent to those skilled in the art from the following detailed description, wherein various aspects are shown and described by way of illustration.

Main

FIG. 5 illustrates a main program process example, according to an embodiment of the invention. This is an example of the wakeup process in the CLK, frequency and baseband (BB) management unit (CFBBMU). All clients send their information and the data is initialized along with the order of harmonic (as indicated by numeral 20). BCD code is established (as indicated by numeral 30), and a spurious map is generated per the band of interest of each client (step 51).

When the spurious map is completed (step 52), the spurious table is obtained for the client and the process is terminated till a new request is received (step 53).

It is understood that other aspects will become readily apparent to those skilled in the art from the following detailed description, wherein various aspects are shown and described by way of illustration.

Output

The spurious table structure is defined as follows, see Table 4 example. As explained hereinabove with respect to FIG. 1, if the calculation is defined for m harmonics and there are 8 frequencies then there are $m^8$ harmonic states for a given BCD code.

It is understood that other aspects will become readily apparent to those skilled in the art from the following detailed description, wherein various aspects are shown and described by way of illustration.

TABLE 4

| Spurious map page at given BCD code | | | | | | | | | |
|---|---|---|---|---|---|---|---|---|---|
| BCD code | 1 | 0 | 1 | 0 | 1 | 0 | 1 | 0 | |
| Sign | + | − | + | − | + | − | + | − | Spur result |
| Freq | $f_1$ | $f_2$ | $f_3$ | $f_4$ | $f_5$ | $f_6$ | $f_7$ | $f_8$ | \|f_spur\| |
| Harmonic order state 1 | 0 | 0 | 0 | 0 | 0 | 0 | 0 | −1 | \|f_spur1\| |
| Harmonic order state 2 | 0 | 0 | 0 | 0 | 0 | 0 | 0 | −2 | \|f_spur2\| |
| . . . | +8 | −5 | +6 | −7 | +3 | −5 | +2 | −7 | \|f_spur\| |
| . . . | . . . | . . . | . . . | . . . | . . . | . . . | . . . | . . . | . . . |
| Harmonic order state $m^8$ | +m | −m | +m | −m | +m | −m | +m | −m | \|f_spur $m^8$\| |

System

FIG. 6 illustrates a MultiCom (MC) system 60 in one single platform. Such a system may contain a cellular transceiver, Wi-Fi, WiGig-IEEE802.11AD, LTE-5G, GPS, BT in a modern user-end (UE) platform, GPS, direct sampling cognitive radio, SATCOM link in other platforms, etc. These radios may operate simultaneously, for example, GPS for a navigation application such as Waze® while performing a voice call via BT in a vehicle. Hence there are several transmitters, receivers and transceivers in such a platform as indicated by numerals 61, 63, 65 and 67, where each has its own unique antenna as designated and as indicated by numerals 62, 64, 66 and 68, respectively.

The MC system comprises transceivers in the same compartment, as in a UE mobile phone, or several transceivers in the same platform or vehicle. The transceivers may share a common bus (item 70), as illustrated in FIG. 7. Such a bus, 70, may be used for transferring from each transceiver (client as indicated by numerals 72, 74, 76 and 78 where each has its own unique antenna as designated and as indicated by numerals 71, 73, 75 and 77, respectively) data to the CFBBMU to produce the spurious map as depicted in FIG. 9. FIG. 9 schematically illustrates a MultiCom system 90 with a bus 90*b* being used for transferring from each transceiver (i.e., client as indicated by 90*d*10, 90*d*20, 90*d*30 and 90*d*40) data to the CFBBMU 90*a*1. The antenna of each client 90*d*10, 90*d*20, 90*d*30 and 90*d*40 is indicated by 90*d*11, 90*d*21, 90*d*31 and 90*d*41, respectively. Or alternately, as in FIG. 7, each transceiver receives from other transceivers the parameters of sampling CLK, IF, LO, DC/DC rates, etc., as shown in FIG. 8 and produces its own spurious matrix. Negotiations of optimal settings between transceivers can be done directly, or via a bus to the CFBBMU that can be an arbitrator that defines priorities of interferences optimization based upon a prior defined hierarchy or any other consideration.

Each transceiver, shown in FIG. 6 and FIG. 7, can be a complex system, as in FIG. 8. In this example, only a receive channel and its peripherals is shown. Such a receiver as depicted in FIG. 8 comprises a base band (BB) section (FIG. 8 item 80*d*) that is implemented in a dedicated BB processing unit such as FPGA, or other commercial processors. The BB unit comprises digital decimation filters such as finite impulse response (FIR) and other functions required to comprise a digital modulator and demodulator (MODEM). The ADC (FIG. 8 item 80*b*) in the receive path is fed by a sampling CLK generated by a phase lock loop (FIG. 8 item 80*c*) or alternately provided by a CLK distribution system (FIG. 8 item 80*i*), which feeds the FPGA and other functions in the system. CLK distribution is excited by a reference source (FIG. 8 item 80*h*) based on an accurate crystal oscillator for fine frequency accuracy where accuracy is defined by the method of reference implementation such as temperature compensated crystal oscillator (TCXO) or oven crystal oscillator (OCXO) or just crystal oscillator (XO) etc. Power regulation is generated by an efficient DC/DC converter (FIG. 8 item 80*f*1) or power management integrated circuit (PMIC) (FIG. 8 item 80*f*) with a dedicated oscillator (FIG. 8 item 80*f*2) to have synchronization to other system CLKs or it may be a self-internal DC/DC CLK. A central processing (FIG. 8, item 80*g*) unit may be also used to manage the entire transceiver. The RF chain converts the radio signals to BB. Such RF chain may be implemented by RFIC or by discrete components. The RF channel contains amplification blocks, filters IF1 (FIG. 8 item 82*a*24) and IF2 (FIG. 8 item 82*a*26) mixers and local oscillators LO1 (FIG. 8 item 81*a*11) and LO2 (FIG. 8 item 81*a*12) based on phase locked loop and synthesizers. It is understood that there is a similar structure, which comprises a transmission section with a digital to analog converter (DAC) and transmitter RF chain. It is understood that all frequency sources in the transceiver define its configuration and are reported to the CFBBMU (FIG. 9 item 90*a*1) for producing the spurious map of a MC system.

Part of the sources may be common to other transceivers, for example, clock distribution, DC/DC, reference crystal (XTAL), or can be exclusive for each transceiver.

FIG. 10 demonstrates an example of a process where each transceiver (client) transfers configuration data to the CFBBMU by the initiated request of the CFBBMU as indicated by steps 100-107 in the figure. Each client transfers its frequency settings (block 102). Each client has an identification ID or index "i" (block 101), where "i" max is the total number of clients (block 103). After collecting all parameters from all transceivers, the CFBBMU generates a spurious map (block 105—defines the order of spur map, block 106—calculates the spur map) and stores it (block 107). This map can be pulled by a client and a specific band of interest map can be sorted. Based on sources in the spurious map table and clients' ID, negotiations are made for optimization.

FIG. 11 demonstrates an example of data pull from the CFBBMU by a client that performs interference mitigation as indicated by steps 1101- to 1117 in the figure. Under this case, a client checks if there are any interfering spurious products in the BB when performing reception. It is understood that an undesired signal might degrade reception performance in terms of BER or Signal to Noise and Distortion (SINAD) thus degrading the quality of service.

This degradation as an example, may prompt an increase in the code rate (CR) and therefore reduce the throughput of the digital transport. In case there is no interference, the client will have no requests or resetting to perform to mitigate interference. However, in case there are interferences that the client becomes a victim. Prior to any negotiations with others, the victim client checks options to mitigate the interference: Applying a notch, ADC sampling frequency Fs shift, LO changes while maintaining reception and observing the figure of merit such as BER and increasing code rate (CR) to improve.

Alternately, if none of the settings helped, and the system is set to perform negotiations, then the requested frequency settings are transferred to the CFBBMU to verify that the victim is not affecting other clients by its desired changes, as demonstrated in FIG. 12 example and as indicated by steps-1201-1209. In FIG. 12 the CFBBMU, as an example, is an arbitrator that can impose settings on clients according to the victim's message on the clipboard. The Victim and the CFBBMU can identify the root cause of interference based on the spurious map, and can predict an optimal setting per the sorted map to the band of interest and the victim measurements as illustrated in FIG. 11.

FIG. 13 illustrates an example of a client victim (1300) RF receiver (1330) that uses a dedicated BB hardware (HW) embedded within the receivers' modem and using part of the MODEMs' receive channel to generate an out of phase cancellation signal. Based on a spurious map (1322) that is provided to the victim by a central CFBBMU via the bus (1310), or that is self-generated by the local CFBBMU (1320) of the victim based on data from all other aggressors, the victim cancels the spurious products. The victim can activate a cancellation loop and inject out of phase spurious signals (1348) to cancel out the interferences. Such cancellation unit comprises ADC (1341), decimation filters (1342), processing unit (1343), and energy estimators (1344) as in any common modem. In addition, it is capable of generating in band tones (1345) from the undesired spurious products and set the phase (1346) to cancel the interferences. The digitally processed cancelation tone is injected at the Rx ADC input. The digital cancellation tone is converted to an analog signal by a DAC (1347).

FIG. 14 depicts a generalized concept of the coexistence management approach. The system can be in the same PCB as in mobile smartphones or SRU where all clients are transceivers, receivers, transmitters with their peripherals such CLKs, DC/DC, etc., it can be distributed, for example, several LRUs with a dedicated bus implemented using USB or other standards as well as dedicated custom made interface where in each LRU there is an SRU with several clients as previously described, or it may contain a single receiver, transmitter, transceiver, etc. All clients (items 14*c*-14*e*) and central CFBBMU (item 14*b*) are connected to a central BUS (item 14*a*) Each client (items 14*c*-14*e*) may have a local CFBBMU (items 14*c*1-14*e*1) and Arbitrator (items 14*c*2-14*e*2). The CFBBMU may produce a spurious map (items 14*c*3-14*e*3), which can be a local map to the client itself, it can be a map produced from all client frequencies, it can be a map of the band of interest produced by the client or it can be a map loaded from a central CFBBMU where the client sorts only frequencies which are within the band of interest of client itself.

Each CFBBMU may have an arbitrator, where the arbitrator prioritizes requests of optimizations based upon priorities, or using neural algorithms and other quality of services parameters of each client that were delivered to the CFBBMU. Quality of service parameters may be CR, BER, Throughput, etc.

A degenerated central CFBBMU may be used to save hardware (HW) (item 14*b*). This central unit does not include the whole client HW; it includes the CFBBMU HW only. On the other hand, the system may nominate one of the clients to serve as a central CFBBMU. Such configuration is flexible and can be determined by firmware or SW, or any other method. The nomination is not limited to a certain client and any client can be nominated to serve as the central CFBBMU with the arbitrator (item 14*b*1) and to generate a central spurious map (item 14*b*2).

The generalized system depicted in FIG. 14 may represent several approaches:

Option 1—Hierarchical: Under this structure, there is a central CFBBMU and Arbitrator, which is the master of all clients. It defines exclusively to each client its settings. It exclusively arbitrates between clients based upon all parameters from clients and system priority configurations or neural algorithms. Under such a structure, there is an option to spare the local CFBBMU.

Option 2—Distributed: Under this structure, each client has a CFBBMU and an Arbitrator. Clients collect from each other the frequencies and frequency plan of each client. Clients calculate the frequency map independently, perform local optimization for their local transceivers, and negotiate with other clients based on radio quality of service parameters (such as BER, CR, and throughput) the optimal or settled settings.

Option 3—Semi Hierarchical: Combination of option 1 and 2

As will be appreciated by one the skilled in the art, the arrangement described in the figures results in a method and apparatus which is capable of providing coexistence management, and spurious products identification management and mitigation in a victim receiver or victim transmitter, and spurious products mitigation and management in aggressors.

All the above descriptions and examples have been given for the purpose of illustration and are not intended to limit the invention in any way. Many different mechanisms, methods of analysis, electronic and logical elements can be employed, all without exceeding the scope of the invention.

The invention claimed is:

1. A method for coexistence and spurious mitigation in multicom platforms formed by a plurality of communication devices, the method comprising:

a) receiving signals from the plurality of communication devices;

b) defining a number of signals and their corresponding frequencies from the signals being received from the plurality of communication devices;

c) defining bands of interest by determining a channel frequency and a bandwidth;

d) analyzing the number of signals and their corresponding frequencies to identify spurious emissions and interferences within the bands of interest being defined;

e) generating a mitigation plan based on the analysis, wherein the mitigation plan includes a spurious map generated based on a Binary Coded Decimal (BCD) code and sign permutations; and f) transmitting the mitigation plan including the spurious map to the communication devices for mitigating spurious products.

2. The method of claim 1, wherein said defining the number of signals further includes selecting from Local Oscillator (LO), Intermediate Frequency (IF), Clock (CLK), or Crystal Oscillator (XTAL) signals.

3. The method of claim 1, further comprising determining the frequency, power, and timing characteristics of the received signals to identify the spurious emissions and interferences.

4. The method of claim 1, further comprising assigning specific frequency bands or channels to the communication devices to minimize the spurious emissions and interferences.

5. The method of claim 1, further comprising adjusting transmission power levels of the communication devices to reduce the spurious emissions and interferences.

6. The method of claim 1, further comprising implementing time-division or frequency-division multiplexing techniques to avoid collisions and interferences between the communication devices.

7. The method of claim 1, further comprising dynamically updating the plan based on changes in the operating environment or performance of the communication devices.

8. A system for coexistence and spurious mitigation in multicom platforms, formed by a plurality of communication devices, the system comprising:

a) a receiver configured to receive signals from the plurality of communication devices;

b) a circuitry configured to analyze the received signals to identify spurious emissions and interferences;

c) a circuitry configured to generate a mitigation plan based on the analysis, wherein the mitigation plan including a spurious map, wherein the spurious map is generated based on Binary Coded Decimal (BCD) code and sign permutations; and d) a transmitter configured to transmit the mitigation plan to the communication devices for mitigating the spurious products.

9. The system of claim 8, wherein the circuitry configured to analyze the received signals further comprises a signal processing circuitry for determining the frequency, power, and timing characteristics of the received signals to identify the spurious emissions and interferences.

10. The system of claim 8, wherein the circuitry configured to generate a plan further comprises a circuitry for assigning specific frequency bands or channels to the communication devices to minimize the spurious emissions and interferences.

11. The system of claim 8, wherein the circuitry configured to generate a plan further comprises a circuitry for adjusting transmission power levels of the communication devices to reduce the spurious emissions and interferences.

12. The system of claim 8, wherein the circuitry configured to generate a plan further comprises a circuitry for implementing time-division or frequency-division multiplexing techniques to avoid collisions and interferences between the communication devices.

13. The system of claim 8, wherein the circuitry configured to generate a plan further comprises a circuitry for dynamically updating the plan based on changes in the operating environment or performance of the communication devices.

14. A method for coexistence and spurious mitigation in multicom platforms, formed by a plurality of communication devices, the method comprising:

a) receiving signals from a plurality of communication devices;

b) analyzing the received signals to identify spurious emissions and interferences;

c) generating a mitigation plan based on the analysis, wherein the mitigation plan includes a spurious map being generated based on Binary Coded Decimal (BCD) code and sign permutations; and c) transmitting the mitigation plan to the communication devices for mitigating the spurious products.

* * * * *